US012755016B2

(12) United States Patent
Gechman et al.

(10) Patent No.: US 12,755,016 B2
(45) **Date of Patent: *Oct. 6, 2026**

(54) RANSOMWARE DETECTION IN MEMORY OF A DATA PROCESSING UNIT USING MACHINE LEARNING DETECTION MODELS

(71) Applicant: Mellanox Technologies, Ltd., Yokneam (IL)

(72) Inventors: Vadim Gechman, Hulda (IL); Nir Rosen, Pardes Hana-Karkur (IL); Haim Elisha, Ashkelon (IL); Bartley Richardson, Alexandria, VA (US); Rachel Allen, Arlington, VA (US); Ahmad Saleh, Reineh Village (IL); Rami Ailabouni, Eilabun (IL); Thanh Nguyen, Huntsvillle, AL (US)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/824,197

(22) Filed: Sep. 4, 2024

(65) Prior Publication Data

US 2024/0427890 A1 Dec. 26, 2024

Related U.S. Application Data

(63) Continuation of application No. 17/864,303, filed on Jul. 13, 2022, now Pat. No. 12,169,563.

(Continued)

(51) Int. Cl.

*G06F 21/56* (2013.01)
*G06N 20/20* (2019.01)

(52) U.S. Cl.

CPC .......... *G06F 21/566* (2013.01); *G06N 20/20* (2019.01); *G06F 2221/034* (2013.01)

(58) Field of Classification Search

CPC ............ G06F 21/566; G06F 2221/034; G06F 21/561; G06N 20/20; G06N 3/0442; G06N 3/0464; G06N 5/01; G06N 3/045

See application file for complete search history.

(56) References Cited

U.S. PATENT DOCUMENTS

| | | | |
|---|---|---|---|
| 9,819,696 | B2 | 11/2017 | Minea et al. |
| 10,198,579 | B2 | 2/2019 | Thakar et al. |

(Continued)

OTHER PUBLICATIONS

Botacin, M et al., "Heaven: A Hardware-Enhanced AntiVirus ENgine to Accelerate Real-time, Signature-based Malware Detection", Expert Systems with Applications, 2022, pp. 1-16.

(Continued)

*Primary Examiner* — Michael Won

(74) *Attorney, Agent, or Firm* — Lowenstein Sandler LLP

(57) ABSTRACT

Apparatuses, systems, and techniques for classifying one or more computer programs executed by a host device as being ransomware using a machine learning (ML) detection system. An integrated circuit is coupled to physical memory of a host device via a host interface. The integrated circuit hosts a hardware-accelerated security service to protect one or more computer programs executed by the host device. The security service obtains a series of snapshots of data stored in the physical memory and extracts a set of features from each snapshot of the series of snapshots, each snapshot representing the data at a point in time. The security service classifies a process of the one or more computer programs as ransomware or non-ransomware using the set of features and outputs an indication of ransomware responsive to the process being classified as ransomware.

20 Claims, 14 Drawing Sheets

Related U.S. Application Data

(60) Provisional application No. 63/309,849, filed on Feb. 14, 2022.

(56) References Cited

U.S. PATENT DOCUMENTS

| | | | |
|---|---|---|---|
| 10,681,069 B2 | 6/2020 | Raz et al. | |
| 10,735,458 B1 | 8/2020 | Haq et al. | |
| 10,917,415 B2 | 2/2021 | Chen | |
| 11,146,581 B2 | 10/2021 | Lotem et al. | |
| 11,425,161 B2 | 8/2022 | Solis Agea et al. | |
| 11,689,550 B2 | 6/2023 | Huang et al. | |
| 11,783,031 B1 | 10/2023 | Han et al. | |
| 12,197,585 B2 * | 1/2025 | Qiao | G06F 18/214 |
| 2011/0292807 A1 | 12/2011 | Shah et al. | |
| 2012/0227105 A1 | 9/2012 | Friedrichs et al. | |
| 2017/0126706 A1 | 5/2017 | Minea et al. | |
| 2017/0134397 A1 | 5/2017 | Dennison et al. | |
| 2017/0155667 A1 | 6/2017 | Sobel | |
| 2018/0159871 A1 | 6/2018 | Komashinskiy et al. | |
| 2018/0248904 A1 | 8/2018 | Villella et al. | |
| 2020/0104498 A1 | 4/2020 | Smith et al. | |
| 2020/0127892 A1 | 4/2020 | Savalle et al. | |
| 2020/0169570 A1 | 5/2020 | Kleymenov | |
| 2020/0314164 A1 | 10/2020 | Crespo Sanchez et al. | |
| 2020/0322363 A1 | 10/2020 | Huang et al. | |
| 2021/0110037 A1 | 4/2021 | Hunt et al. | |
| 2021/0141897 A1 | 5/2021 | Seifert et al. | |
| 2021/0185057 A1 | 6/2021 | McLean | |
| 2021/0249085 A1 | 8/2021 | Hong et al. | |
| 2021/0377301 A1 | 12/2021 | Desai et al. | |
| 2022/0030017 A1 | 1/2022 | Infante-Lopez et al. | |
| 2022/0046057 A1 | 2/2022 | Kutt et al. | |
| 2022/0092010 A1 | 3/2022 | Thyamagondlu et al. | |
| 2022/0147629 A1 | 5/2022 | Vasilenko et al. | |
| 2022/0232025 A1 | 7/2022 | Kapoor et al. | |
| 2022/0255897 A1 | 8/2022 | Miele et al. | |
| 2023/0259614 A1 | 8/2023 | Gechman et al. | |
| 2023/0259625 A1 | 8/2023 | Gechman et al. | |
| 2023/0262076 A1 | 8/2023 | Gechman et al. | |
| 2023/0319108 A1 | 10/2023 | Gechman et al. | |
| 2023/0336574 A1 | 10/2023 | Rozenbaum et al. | |
| 2023/0370490 A1 | 11/2023 | Crabtree et al. | |
| 2023/0401321 A1 | 12/2023 | Moshe et al. | |
| 2023/0409715 A1 | 12/2023 | Nissim et al. | |
| 2024/0086527 A1 | 3/2024 | Rosen et al. | |
| 2024/0086536 A1 | 3/2024 | Rosen et al. | |

OTHER PUBLICATIONS

Botacin, M et al., "Near-Memory & In-Memory Detection of Fileless Malware," Proceedings of the International Symposium on Memory Systems, 2020, pp. 23-38.

Das, S et al., "Semantics-Based Online Malware Detection: Towards Efficient Real-time Protection Against Malware," IEEE Transactions on Information Forensics and Security, 2015, pp. 1-14.

Petroni Jr, N L et al., "Copilot—a Coprocessor-based Kernel Runtime Integrity Monitor", USENIX Association, 2004, pp. 1-17.

Zago, M et al., "Early DGA-based Botnet Identification: Pushing Detection to the Edges", Cluster Computing, 2020, pp. 1-16.

* cited by examiner

RANSOMWARE DETECTION IN MEMORY OF A DATA PROCESSING UNIT USING MACHINE LEARNING DETECTION MODELS

RELATED APPLICATIONS

This application is a continuation of U.S. application Ser. No. 17/864,303, filed Jul. 13, 2022, which claims the benefit of U.S. Provisional Application No. 63/309,849, filed Feb. 14, 2022, the entire contents of which are incorporated by reference. This application is related to co-pending U.S. application Ser. No. 17/864,306, co-pending U.S. application Ser. No. 17/864,310, and co-pending U.S. application Ser. No. 17/864,312, all of which were filed concurrently.

TECHNICAL FIELD

At least one embodiment pertains to processing resources used to perform and facilitate operations for detecting whether one or more computer programs are subject to malicious activity. For example, at least one embodiment pertains to processors or computing systems used to provide and enable a data processing unit (DPU) to determine, using a machine learning (ML) detection system, whether one or more computer programs, executed by a host device, are subject to malicious activity based on features extracted from data stored in physical memory of the host device, according to various novel techniques described herein.

BACKGROUND

Machine learning involves training a computing system-using training data-to identify features in data that may facilitate detection and classification. Training can be supervised or unsupervised. Machine learning models can use various computational algorithms, such as decision tree algorithms (or other rule-based algorithms), artificial neural networks, and the like. During an inference stage, new data is input into a trained machine learning model, and the trained machine learning model can classify items of interest using features identified during training.

BRIEF DESCRIPTION OF DRAWINGS

Various embodiments in accordance with the present disclosure will be described with reference to the drawings, in which.

DETAILED DESCRIPTION

Figure 1A:
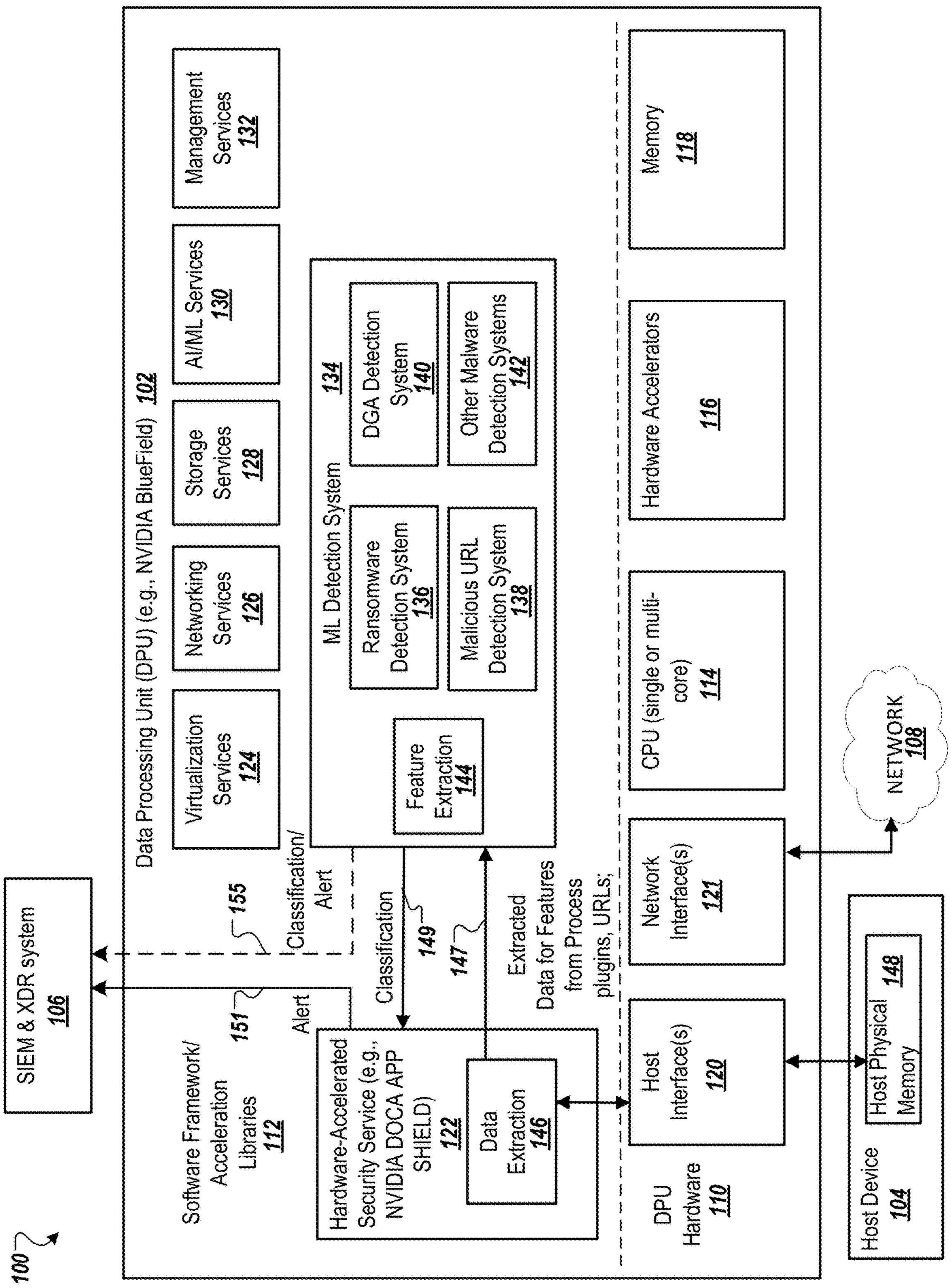
FIG. 1A is a block diagram of an example system architecture, according to at least one embodiment.

Malicious activity can be disruptive to computer systems. Malicious activity can be caused by malware (also referred to as malicious software or malicious code). Malware is any software intentionally designed to cause disruption to a computer, server, client, or computer network, leak private information, gain unauthorized access to information or resources, deprive users of access to information, or knowingly interfere with the user's computer security and privacy. Common malware can include computer viruses (e.g., a Trojan horse virus) or other infectious malware, worms, spyware, adware, rogue software, wiper, scareware, ransomware, backdoors, phishing, or the like.

One type of malicious activity is caused by ransomware. Ransomware is a malware designed to deny a user or organization access to files on their computer. Ransomware can be encryption-based or screen-lock-based ransomware. For example, by encrypting files and demanding a ransom payment for the decryption key, ransomware places organizations in a position where paying the ransom is the easiest and cheapest way to regain access to their files. Ransomware has quickly become the most prominent and visible type of malware. Recent ransomware attacks have impacted hospitals' ability to provide crucial services, crippled public services in cities, and caused significant damage to various organizations. Existing security solutions for ransomware are installed on a host machine or a virtual machine (e.g., agent-based antivirus solutions). These existing solutions are insufficient since malware can evade them. Moreover, these tools are largely incapable of detecting new unknown malware because most of them are based on static analysis, and it is easier to create different malware with different static features.

Another type of malicious activity is caused by malicious URLs. A malicious URL is a link created with the purpose of promoting scams, attacks, and frauds. By clicking on a malicious URL, a user can download ransomware, virus, Trojan, or any other type of malware that will compromise the machine or even an organization's network. A malicious URL can also be used to persuade a user to provide sensitive information on a fake website. Existing security solutions for malicious URLs are insufficient since they focus on detecting malicious URLs by only monitoring external sources, like emails, downloaded files, or the like. This means that if a URL infiltrates the host machine or the virtual machine, the current detection systems do not detect it until used in one of the external sources. Sometimes hackers use encryption or obfuscation to hide malicious URLs in files. These URLs in the files are hidden or obfuscated from a scan or a user being lured to click on them, only revealing themselves in memory.

Another type of malicious activity is caused by domain generation algorithm (DGA) malware. DGA malware establishes a connection with a command-and-control (C&C) server by periodically generating a large number of candidate domain names for the command-and-control server and queries all of these algorithmically generated domains in order to resolve an Internet Protocol (IP) address of the command-and-control server. The adversary registers one of those DGA-generated domain names for the command-and-control server in advance using the same algorithm embedded in the DGA malware. Eventually, malware queries the adversary's pre-registered domain name and resolves the IP address of the command-and-control server. Then the malware starts communicating with the command-and-control server to receive new commands and updates. If the DGA malware cannot find the command-and-control server at its previous domain name, it queries to the next set of DGA-generated domain names until it finds one that works. Existing security solutions for DGA malware detect DGA domains when the DGA malware is querying domain name system (DNS) requests to resolve the command-and-control server's IP address.

Embodiments of the present disclosure address the above and other deficiencies by hosting a hardware-accelerated security service on an acceleration hardware engine of an integrated circuit. The hardware-accelerated security service extracts features from data stored in the memory and associated with one or more computer programs executed by a central processing unit (CPU) and determines, using an ML detection system, whether the one or more computer programs are subject to malicious activity based on the features extracted from the data stored in the memory. The hardware-accelerated security service outputs an indication of the malicious activity responsive to a determination that one or more computer programs are subject to the malicious activity. The computer programs can be any of a host operating system (OS), an application, a guest operating system, a guest application, or the like. The hardware-accelerated security service operating on a DPU is an agentless hardware product that inspects the memory of the one or more computer programs. As such, the malware is unaware of its existence, and the hardware-accelerated security service can detect the malware during the attack, i.e., when the malware exposes itself in memory, which is easier to detect the malware. In at least one embodiment, the hardware-accelerated security service is the NVIDIA BlueField AppShield. Alternatively, other hardware-accelerated security services can be used. As such, malware is unaware of its existence. In some cases, the ML detection system detects the malicious activity during an attack, in which the malware exposes itself and is easier to detect. The integrated circuit can be a data processing unit (DPU), a programmable data center infrastructure on a chip. The integrated circuit can include a network interface operatively coupled to the CPU to handle network data path processing, and the CPU can control path initialization and exception processing.

As described above, existing solutions for ransomware are installed on a host machine or a virtual machine (e.g., agent-based antivirus solutions) and are insufficient because ransomware can evade them, and they are incapable of detecting new unknown malware because of their static analysis. Embodiments of the present disclosure address the above and other deficiencies with respect to ransomware by using an agentless hardware product that inspects the memory of the one or more computer programs, making it so ransomware is unaware of its existence, and detects the ransomware during the attack when the ransomware has exposed itself. Embodiments of the present disclosure address the above and other deficiencies with respect to ransomware by obtaining a series of snapshots of the data stored in the memory and extracting a set of features from each snapshot of the series of snapshots, each snapshot representing the data at a point in time. The ML detection system can include a random-forest classification model. The random-forest classification model is a time-series-based model trained to classify a process as ransomware or non-ransomware using cascading of different numbers of snapshots in the series of snapshots (e.g., 3, 5, and 10 snapshots).

As described above, existing solutions for malicious URLs monitor external sources, like email, for detection and are insufficient since these malicious URLs sometimes only reveal themselves in memory as they are encrypted or obfuscated URLs. Embodiments of the present disclosure address the above and other deficiencies with respect to malicious URLs by monitoring the memory from malicious URLs to detect even encrypted and obfuscated URLs. Embodiments of the present disclosure can provide an extended solution to existing security solutions where encrypted or obfuscated URLs are used to evade the existing security solutions. Embodiments of the present disclosure address the above and other deficiencies with respect to malicious URLs by obtaining a snapshot of the data stored in the memory and extracting a set of features from the snapshot. The set of features can include words in a candidate URL and numeric features of a URL structure of the candidate URL, such as a length, count, position, or the like of the specified URL structure. The ML detection system can include a binary classification model trained to classify the candidate URL as malicious or benign using the set of features.

As described above, existing solutions for DGA malware detect DGA domains when the DGA malware is querying DNS requests to resolve the IP address of the command-and-control server. Embodiments of the present disclosure address the above, and other deficiencies with respect to DGA malware in that DGA domains can be detected inside the memory before the DGA malware is trying to establish a connection with the command-and-control server. By detecting the DGA domain in memory before establishing a connection, the embodiments of the present disclosure can eliminate the DGA malware rapidly and efficiently, even before the DGA malware exposes itself with a DNS request.

In addition, in most cases, the DGA malware generates multiple domains to try to connect with the command-and-control server. Embodiments of the present disclosure can collect the domains for each process, increasing a detection rate by ML model because it can be based on a combined decision of all the domains processed together. Embodiments of the present disclosure address the above and other deficiencies with respect to DGA malware by obtaining a snapshot of the data stored in the memory and extracting a set of features from the snapshot. The set of features can include one or more candidate URLs. The ML detection system can include a two-stage classification model. The two-stage classification model can include a binary classification model trained to classify the one or more candidate URLs as having a DGA domain or a non-DGA domain in a first stage and a multi-class classification model trained to classify a DGA family of the DGA domain between a set of DGA families. The binary classification model can be trained to classify the one or more candidate URLs as generated by a DGA malware in a first stage, and the multi-class classification model can be trained to classify a DGA family of the DGA malware between a set of DGA malware families.

System Architecture

FIG. 1A is a block diagram of an example system architecture 100, according to at least one embodiment. The system architecture 100 (also referred to as "system" or "computing system" herein) includes an integrated circuit, labeled DPU 102, a host device 104, a security information and event management (SIEM) or extended detection and response (XDR) system 106. The system architecture 100 can be part of a data center and include one or more data stores, one or more server machines, and other components of data center infrastructure. In implementations, network 108 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In at least one embodiment, DPU 102 is integrated as a System on a Chip (SoC) that is considered a data center infrastructure on a chip. In at least one embodiment, DPU 102 includes DPU hardware 110 and software framework with acceleration libraries 112. The DPU hardware 110 can include a CPU 114 (e.g., a single-core or multi-core CPU), one or more hardware accelerators 116, memory 118, one or more host interfaces 120, and one or more network interfaces 121. The software framework and acceleration libraries 112 can include one or more hardware-accelerated services, including hardware-accelerated security service 122 (e.g., NVIDIA DOCA APPSHIELD) (also referred to herein as "AppShield"), hardware-accelerated virtualization services 124, hardware-accelerated networking services 126, hardware-accelerated storage services 128, hardware-accelerated artificial intelligence/machine learning (AI/ML) services 130, and hardware-accelerated management services 132. In at least one embodiment, DPU 102 includes an ML detection system 134 that includes one or more ML detection models trained to determine whether one or more computer programs, executed by the host device 104 (e.g., a physical machine or a virtual machine (VM)), are subject to malicious activity based on features extracted from data stored in host physical memory 148, the data associated with the one or more computer programs. Host physical memory 148 can include one or more volatile and/or non-volatile memory devices that are configured to store the data of host device 104. In at least one embodiment, ML detection system 134 includes a ransomware detection system 136, a malicious URL detection system 138, a DGA detection system 140, and optionally other malware detection systems 142.

In at least one embodiment, hardware-accelerated security service 122 includes data extraction logic 146 that extracts data (referred to as extracted data 147) stored in host physical memory 148 via host interface 120. In at least one embodiment, data extraction logic 146 can obtain a snapshot of the data or a series of snapshots of the data stored in host physical memory 148 via host interface 120. Each snapshot represents the data at a point in time. In at least one embodiment, data extraction logic 146 has feature extraction logic to extract one or more features and send the extracted features to ML detection system 134 instead of extracted data 147. For example, data extraction logic 146 can extract a candidate URL out of extracted data 147 and send the candidate URL to ML detection system 134.

In at least one embodiment, data extraction logic 146 extracts and sends a series of snapshots to ML detection system 134, and ML detection system 134 includes feature extraction logic 144 to extract a set of features from different process plugins such as memory plugins. Feature extraction logic 144 extracts a set of features from different memory plugins from each snapshot of the series of snapshots. In at least one embodiment, extracted features are fed into ransomware detection system 136. In at least one embodiment, ransomware detection system 136 includes a random-forest classification model. The random-forest classification model can be a time-series-based model trained to classify a process as ransomware or non-ransomware using cascading of different numbers of snapshots in the series of snapshots. In at least one embodiment, the cascading of a different number of snapshots in the series includes a first number of snapshots obtained over a first amount of time, a second number of snapshots obtained over a second amount of time greater than the first amount of time, and a third number of snapshots obtained over a third amount of time greater than the second amount of time. The second number of snapshots includes the first number of snapshots, and the third number of snapshots includes the second number of snapshots. Additional details of the different memory plugins and the random-forest classification model are described below with respect to FIGS. 3A-4.

In at least one embodiment, data extraction logic 146 extracts and sends a snapshot to ML detection system 134, and ML detection system 134 includes feature extraction logic 144 to extract a set of features from the snapshot. The set of features includes words in a candidate URL and numeric features of a URL structure of the candidate URL. The URL structure can include a scheme, a sub-domain, a domain, a top-level domain (TLD), a Port, a Path, a Query, a Fragment, or other structures like second-level domains, subdirectories, or the like, such as illustrated in FIG. 6. The numeric features can include a length of a word in the candidate URL, a count of different parts of the URL structure (e.g., two TLDs, an indication of a port, three fragments, or the like). In at least one embodiment, feature extraction logic 144 can extract the words and numeric features of the candidate URL and tokenize the words into tokens. In at least one embodiment, malicious URL detection system 138 includes a binary classification model trained to classify the candidate URL as malicious or benign using the set of features. In at least one embodiment, the binary classification model includes an embedding layer, a Long Short-Term Memory (LSTM) layer, and a fully connected neural network layer. The embedding layer receives the tokens as an input sequence of tokens representing the words in the candidate URL and generates an input vector based on the input sequence of tokens. The LSTM layer is trained to generate an output vector based on the input vector. The fully connected neural network layer is trained to classify the candidate URL as malicious or benign using the output vector from the LSTM layer and the numeric features of the URL structure. Additional details of the features of URLs and the binary classification model are described below with respect to FIGS. 5A-7.

In at least one embodiment, data extraction logic 146 extracts and sends a snapshot to ML detection system 134, and ML detection system 134 includes feature extraction logic 144 to extract a set of features from the snapshot. The set of features includes domain characters in one or more candidate URLs. The domain of candidate URLs can include multiple domain characters, and feature extraction logic 144 can extract the domain characters as features of the one or more candidate URLs. Feature extraction logic 144 can tokenize the domain characters into tokens. In at least one embodiment, DGA detection system 140 includes a two-stage classification model. The two-stage classification model can include a binary classification model in a first stage and a multi-class classification model in a second stage. The binary classification model is trained to classify the one or more candidate URLs as having a DGA domain or a non-DGA domain in the first stage using the set of features. The multi-class classification model is trained to classify a DGA family of the DGA domain between a set of DGA families in the second stage using the set of features. In at least one embodiment, the binary classification model is a convolutional neural network (CNN) with an embedding layer to receive the tokens as an input sequence of tokens representing the domain characters in the one or more candidate URLs and generate an input vector based on the input sequence of tokens. The CNN is trained to classify the one or more candidate URLs as having the DGA domain or the non-DGA domain in the first stage using the input vector from the embedding layer. In at least one embodiment, the multi-class classification model includes a Siamese network of the CNN with the embedding layer. The Siamese network is trained to classify the DGA family in the second stage using the input vector from the embedding layer. Additional details of the features of URLs and the binary classification model are described below with respect to FIGS. 8A-10.

In at least one embodiment, ML detection system 134 can output an indication 149 of classification by ML detection system 134. Indication 149 can be an indication of ransomware, an indication of malicious URL, an indication of DGA domain, an indication that one or more computer programs executed by host device 104 are subject to malicious activity, an indication of classification by other malware detection systems 142, or the like. In at least one embodiment, ML detection system 134 can send indication 149 to hardware-accelerated security service 122, and hardware-accelerated security service 122 can send an alert 151 to SIEM or XDR system 106. Alert 151 can include information about ransomware, malicious URLs, DGA domains, or the like. In at least one embodiment, ML detection system 134 can send indication 155 to SIEM or XDR system 106, in addition to or instead of sending indication 149 to hardware-accelerated security service 122.

Figure 1B:
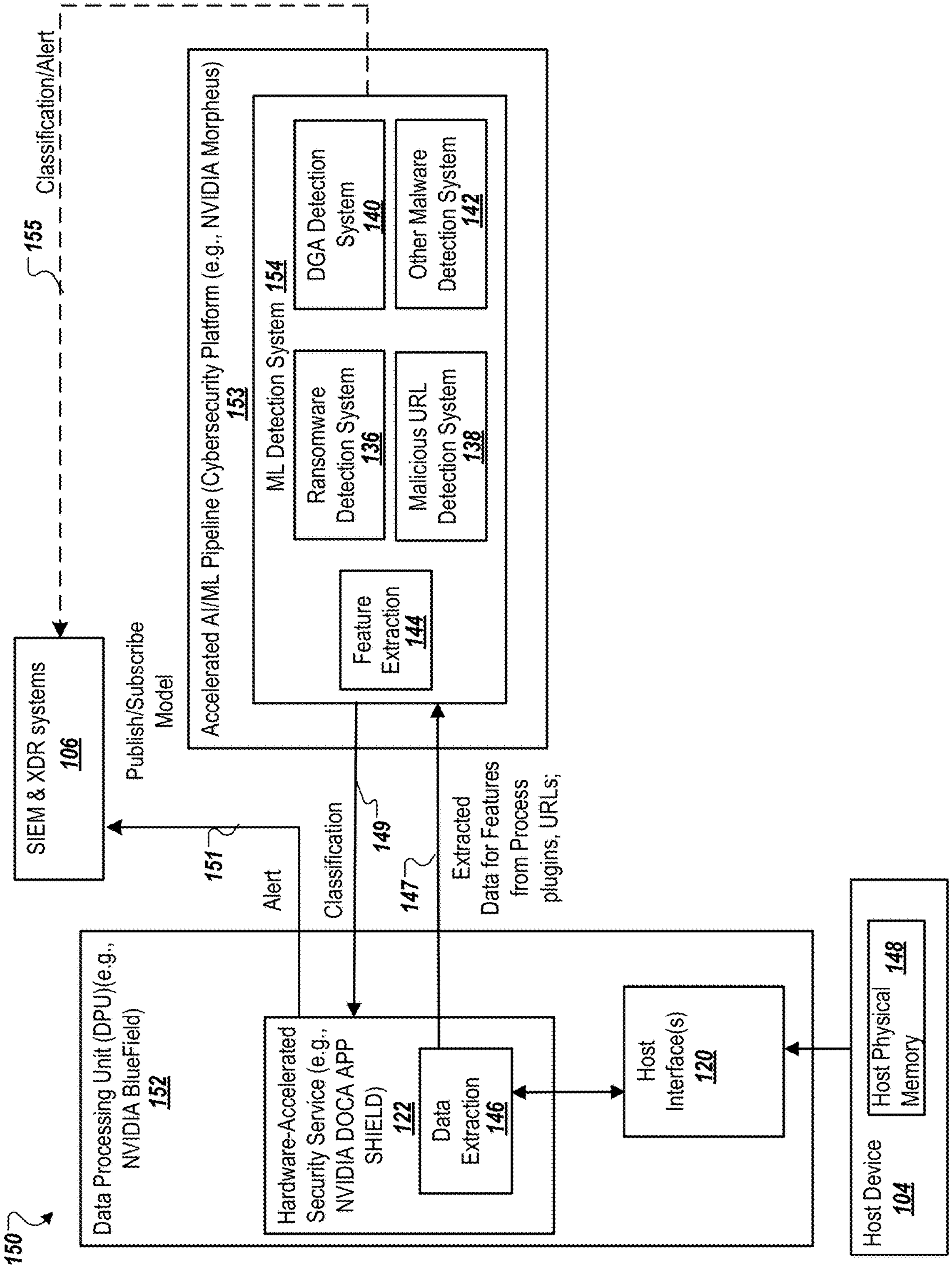
FIG. 1B is a block diagram of an example system architecture, according to at least one embodiment.

In at least one embodiment, DPU 102 extracts the data stored in host physical memory 148 and sends extracted data 147 to another computing system hosting an ML detection system, such as illustrated in FIG. 1B, where an ML detection system 154 is hosted on an accelerated AI/ML pipeline 153. In at least one embodiment, the accelerated AI/ML pipeline can be the NVIDIA MORPHEUS cybersecurity platform. Accelerated AI/ML Pipeline 153 can perform pre-processing operations, inferences, post-processing operations, actions, or any combination thereof. Accelerated AI/ML Pipeline 153 can be a combination of hardware and software, such as the NVIDIA EXG platform and software for accelerating AI/ML operations on the NVIDIA EXG platform. Accelerated AI/ML Pipeline 153 can provide advantages in accelerating processes up to 60 times compared to a CPU, for example. Accelerated AI/ML Pipeline 153 can also provide an advantage of a number of inferences that can be done in parallel (e.g., up to millions of inferences in parallel). Additional details of ML detection system 154 are described below with respect to FIG. 1B.

It should be noted that, unlike a CPU or graphics processing unit (GPU), DPU 102 is a new class of programmable processor that combines three key elements, including, for example: 1) an industry-standard, high-performance, software-programmable, CPU (single-core or multi-core CPU), tightly coupled to the other SoC components; 2) a high-performance network interface capable of parsing, processing and efficiently transferring data at line rate, or the speed of the rest of the network, to GPUs and CPUs; and 3) a rich set of flexible and programmable acceleration engines that offload and improve applications performance for AI and machine learning, security, telecommunications, and storage, among others. These capabilities can enable an isolated, bare-metal, cloud-native computing platform for cloud-scale computing. In at least one embodiment, DPU 102 can be used as a stand-alone embedded processor. In at least one embodiment, DPU 102 can be incorporated into a network interface controller (also called a Smart Network Interface Card (SmartNIC)) that is used as a component in a server system. A DPU-based network interface card (network adapter) can offload processing tasks that the server system's CPU would normally handle. Using its own onboard processor, a DPU-based SmartNIC may be able to perform any combination of encryption/decryption, firewall, transport control protocol/Internet Protocol (TCP/IP), and HyperText Transport Protocol (HTTP) processing. SmartNICs can be used for high-traffic web servers, for example.

In at least one embodiment, DPU 102 can be configured for traditional enterprises' modern cloud workloads and high-performance computing. In at least one embodiment, DPU 102 can deliver a set of software-defined networking, storage, security, and management services (e.g., 122-132) at a data-center scale with the ability to offload, accelerate, and isolate data center infrastructure. In at least one embodiment, DPU 102 can provide multi-tenant, cloud-native environments with these software services. In at least one embodiment, DPU 102 can deliver data center services of up to hundreds of CPU cores, freeing up valuable CPU cycles to run business-critical applications. In at least one embodiment, DPU 102 can be considered a new type of processor that is designed to process data center infrastructure software to offload and accelerate compute load of virtualization, networking, storage, security, cloud-native AI/ML services, and other management services (e.g., 122-132).

In at least one embodiment, DPU 102 can include connectivity with packet-based interconnects (e.g., Ethernet), switched-fabric interconnects (e.g., InfiniBand, Fibre Channels, Omni-Path), or the like. In at least one embodiment, DPU 102 can provide a data center that is accelerated, fully programmable, and configured with security (e.g., zero-trust security) to prevent data breaches and cyberattacks. In at least one embodiment, DPU 102 can include a network adapter, an array of processor cores, and infrastructure offload engines with full software programmability. In at least one embodiment, DPU 102 can sit at an edge of a server to provide flexible, secured, high-performance cloud and AI workloads. In at least one embodiment, DPU 102 can reduce the total cost of ownership and increase data center efficiency. In at least one embodiment, DPU 102 can provide the software framework with acceleration libraries 112 (e.g., NVIDIA DOCA™) that enables developers to rapidly create applications and services for DPU 102, such as security services 122, virtualization services 124, networking services 126, storage services 128, AI/ML services 130, and management services 132. In at least one embodiment, ML detection system 134 is implemented in the AI/ML services 130. In another embodiment, ML detection system 134 is implemented on one or more hardware accelerators 116 or other components of the DPU hardware 110. In at least one embodiment, the software framework with acceleration libraries 112 makes it easy to leverage hardware accelerators of DPU 102 to provide data center performance, efficiency, and security.

In at least one embodiment, DPU 102 can provide networking services 126 with a virtual switch (vSwitch), a virtual router (vRouter), network address translation (NAT), load balancing, and network virtualization (NFV). In at least one embodiment, DPU 102 can provide storage services 128, including NVME™ over fabrics (NVMe-oF™) technology, elastic storage virtualization, hyper-converged infrastructure (HCl) encryption, data integrity, compression, data deduplication, or the like. NVM Express™ is an open logical device interface specification for accessing non-volatile storage media attached via the PCI Express® (PCIe) interface. NVMe-OF™ provides an efficient mapping of NVMe commands to several network transport protocols, enabling one computer (an "initiator") to access block-level storage devices attached to another computer (a "target") very efficiently and with minimum latency. The term "Fabric" is a generalization of the more specific ideas of network and input/output (I/O) channel. It essentially refers to an N:M interconnection of elements, often in a peripheral context. The NVMe-oF™ technology enables the transport of the NVMe command set over a variety of interconnection infrastructures, including networks (e.g., Internet Protocol (IP)/Ethernet) and also I/O Channels (e.g., Fibre Channel). In at least one embodiment, DPU 102 can provide security services 122 using Next-Generation Firewall (NGFW), Intrusion Detection Systems (IDS), Intrusion Prevention System (IPS), a root of trust, micro-segmentation, distributed denial-of-service (DDoS) prevention technologies, and ML detection using data extraction logic 146 (of AppShield) and ML detection system 134. NGFW is a network security device that provides capabilities beyond a stateful firewall, like application awareness and control, integrated intrusion prevention, and cloud-delivered threat intelligence. In at least one embodiment, the one or more network interfaces 121 can include an Ethernet interface (single or dual ports) and an InfiniBand interface (single or dual ports). In at least one embodiment, the one or more host interfaces 120 can include a PCIe interface and a PCIe switch. In at least one embodiment, the one or more host interfaces 120 can include other memory interfaces. In at least one embodiment, CPU 114 can include multiple cores (e.g., up to 8 64-bit core pipelines) with L2 cache per one or two cores and L3 cache with eviction policies support for double data rate (DDR) dual in-line memory module (DIMM) (e.g., DDR4 DIMM support), and a DDR4 DRAM controller. Memory 118 can be on-board DDR4 memory with error correction code (ECC) error protection support. In at least one embodiment, CPU 114 can include a single core with L2 and L3 caches and a DRAM controller. In at least one embodiment, the one or more hardware accelerators 116 can include a security accelerator, a storage accelerator, and a networking accelerator. In at least one embodiment, ML detection system 134 is hosted by the security accelerator. In at least one embodiment, the security accelerator can provide a secure boot with hardware root-of-trust, secure firmware updates, Cerberus compliance, Regular expression (RegEx) acceleration, IP security (IPsec)/Transport Layer Security (TLS) data-in-motion encryption, AES-GCM 128/256-bit key for data-at-rest encryption (e.g., Advanced Encryption Standard (AES) with ciphertext stealing (XTS) (e.g., AES-XTS 256/512), secure hash algorithm (SHA) 256-bit hardware acceleration, Hardware public key accelerator (e.g., Rivest-Shamir-Adleman (RSA), Diffie-Hellman, Digital Signal Algorithm (DSA), ECC, Elliptic Curve Cryptography Digital Signal Algorithm (EC-DSA), Elliptic-curve Diffie-Hellman (EC-DH)), and True random number generator (TRNG). In at least one embodiment, the storage accelerator can provide BlueField SNAP—NVMe™ and VirtIO-blk, NVMe-OF™ acceleration, compression, and decompression acceleration, and data hashing and deduplication. In at least one embodiment, the network accelerator can provide remote direct memory access (RDMA) over Converged Ethernet (ROCE), Zero Touch ROCE, Stateless offloads for TCP, IP, and User Datagram Protocol (UDP), Large Receive Offload (LRO), Large Segment Offload (LSO), checksum, Total Sum of Squares (TSS), Residual Sum of Squares (RSS), HTTP dynamic streaming (HDS), and virtual local area network (VLAN) insertion/stripping, single root I/O virtualization (SR-IOV), virtual Ethernet card (e.g., VirtIO-net), Multi-function per port, VMware NetQueue support, Virtualization hierarchies, and ingress and egress Quality of Service (QoS) levels (e.g., 1K ingress and egress QoS levels). In at least one embodiment, DPU 102 can also provide boot options including secure boot (RSA authenticated), remote boot over Ethernet, remote boot over Internet Small Computer System Interface (iSCSI), Preboot execution environment (PXE), and Unified Extensible Firmware Interface (UEFI).

In at least one embodiment, DPU 102 can provide management services including 1 GbE out-of-band management port, network controller sideband interface (NC-SI), Management Component Transport Protocol (MCTP) over System Management Bus (SMBus), and Monitoring Control Table (MCT) over PCIe, Platform Level Data Model (PLDM) for Monitor and Control, PLDM for Firmware Updates, Inter-Integrated Circuit (I2C) interface for device control and configuration, Serial Peripheral Interface (SPI) interface to flash, embedded multi-media card (eMMC) memory controller, Universal Asynchronous Receiver/Transmitter (UART), and Universal Serial Bus (USB).

In at least one embodiment, hardware-accelerated security service 122 is an adaptive cloud security service (e.g., NVIDIA APP SHIELD) that provides real-time network visibility, detection, and response for cyber threats. In at least one embodiment, hardware-accelerated security service 122 acts as the monitoring or telemetry agent for DPU 102 or for a cybersecurity platform (e.g., 153 in FIG. 1B), such as the NVIDIA Morpheus platform, which is an AI-enabled, cloud-native cybersecurity platform. The NVIDIA Morpheus platform is an open application framework that enables cybersecurity developers to create AI/ML pipelines for filtering, processing, and classifying large volumes of real-time data, allowing customers to continuously inspect network and server telemetry at scale. The NVIDIA Morpheus platform can provide information security to data centers to enable dynamic protection, real-time telemetry, and adaptive defenses for detecting and remediating cybersecurity threats.

Previously, users, devices, data, and applications inside the data center were implicitly trusted, and perimeter security was sufficient to protect them from external threats. In at least one embodiment, DPU 102, using hardware-accelerated security service 122, can define the security perimeter with a zero-trust protection model that recognizes that everyone and everything, both inside and outside the network, cannot be trusted. Hardware-accelerated security service 122 can enable network screening with encryption, granular access controls, and micro-segmentation on every host and for all network traffic. Hardware-accelerated security service 122 can provide isolation, deploying security agents in a trusted domain separate from the host domain. In the event a host device is compromised, this isolation by hardware-accelerated security service 122 prevents the malware from knowing about or accessing hardware-accelerated security service 122, helping to prevent the attack from spreading to other servers. In at least one embodiment, the hardware-accelerated security service 122 described herein can provide host monitoring, enabling cybersecurity vendors to create accelerated intrusion detection system (IDS) solutions to identify an attack on any physical or virtual machine. Hardware-accelerated security service 122 can feed data about application status to SIEM or XDR system 106. Hardware-accelerated security service 122 can also provide enhanced forensic investigations and incident response.

As described above, attackers attempt to exploit breaches in security control mechanisms to move laterally across data center networks to other servers and devices. Hardware-accelerated security service 122 described herein can enable security teams to shield their application processes, continuously validate their integrity, and, in turn, detect malicious activity. In the event that an attacker kills the security control mechanism's processes, hardware-accelerated security service 122 described herein can mitigate the attack by isolating the compromised host device, preventing the malware from accessing confidential data or spreading to other resources.

Conventionally, security tools run in the same host domain as the malware. So, stealthy malware can employ hiding techniques from the host device, enabling the malware to silently take over and tamper with agents and the operating system (OS). For example, if anti-virus software is running on a host device that needs to continue to operate or not be suspended, hardware-accelerated security service 122 described herein can actively monitor the process to determine any anomalies, malware, or intrusion as described in more detail in the various embodiments described below. In this case, the malware runs in the host domain, and hardware-accelerated security service 122 runs in a separate domain than the host domain.

Host device 104 may be a desktop computer, a laptop computer, a smartphone, a tablet computer, a server, or any suitable computing device capable of performing the techniques described herein. In some embodiments, host device 104 may be a computing device of a cloud-computing platform. For example, host device 104 may be a server machine of a cloud-computing platform or a component of the server machine. In such embodiments, host device 104 may be coupled to one or more edge devices (not shown) via network 108. An edge device refers to a computing device that enables the communication between computing devices at the boundary of two networks. For example, an edge device may be connected to host device 104, one or more data stores, one or more server machines via network 108, and may be connected to one or more endpoint devices (not shown) via another network. In such an example, the edge device can enable communication between host device 104, one or more data stores, one or more server machines, and the one or more client devices. In other or similar embodiments, host device 104 may be an edge device or a component of an edge device. For example, host device 104 may facilitate communication between one or more data stores, one or more server machines, which are connected to host device 104 via network 108, and one or more client devices that are connected to host device 104 via another network.

In still other or similar embodiments, host device 104 can be an endpoint device or a component of an endpoint device. For example, host device 104 may be, or may be a component of, devices, such as televisions, smart phones, cellular telephones, data center servers, data DPUs, personal digital assistants (PDAs), portable media players, netbooks, laptop computers, electronic book readers, tablet computers, desktop computers, set-top boxes, gaming consoles, a computing device for autonomous vehicles, a surveillance device, and the like. In such embodiments, host device 104 may be connected to DPU 102 over the one or more network interfaces 121 via network 108. In other or similar embodiments, host device 104 may be connected to an edge device (not shown) via another network, and the edge device may be connected to DPU 102 via network 108.

In at least one embodiment, the host device 104 executes one or more computer programs. The one or more computer programs can be any process, routine, or code executed by the host device 104, such as a host OS, an application, a guest OS of a virtual machine, or a guest application, such as executed in a container. Host device 104 can include one or more CPUs of one or more cores, one or more multi-core CPUs, one or more GPUs, one or more hardware accelerators, or the like.

In at least one embodiment, the one or more computer programs reside in a first computing domain (e.g., a host domain), and hardware-accelerated security service 122 and ML detection system 134 reside in a second computing domain (e.g., DPU domain or infrastructure domain) different than the first computing domain. In at least one embodiment, the malicious activity is caused by malware, and hardware-accelerated security service 122 is out-of-band security software in a trusted domain that is different and isolated from the malware. That is, the malware may reside in a host domain, and hardware-accelerated security service 122, being in the trusted domain, can monitor the physical memory to detect the malware in the host domain. In at least one embodiment, DPU 102 includes a direct memory access (DMA) controller (not illustrated in FIG. 1A) coupled to host interface 120. The DMA controller can read the data from host physical memory 148 via host interface 120. In at least one embodiment, the DMA controller reads data from host physical memory 148 using the PCIe technology. Alternatively, other technologies can be used to read data from host physical memory 148.

Although various embodiments described above are directed to embodiments where hardware-accelerated security service 122 and ML detection system 134 are implemented in DPU 102, in other embodiments, some operations are performed on DPU 102, and other operations are performed on another computing device, such as described and illustrated in FIG. 1B. In other embodiments, DPU 102 may be any computing system or computing device capable of performing the techniques described herein.

FIG. 1B is a block diagram of an example system architecture 150, according to at least one embodiment. The system architecture 150 is similar to system architecture 100 as noted by similar reference numbers, except as set forth below. The system architecture 150 includes an integrated circuit, labeled DPU 152, host device 104, SIEM or XDR system 106, and accelerated AI/ML pipeline 153. As described above, accelerated AI/ML pipeline 153 is a cybersecurity platform. In at least one embodiment, the accelerated AI/ML pipeline can be the NVIDIA MORPHEUS cybersecurity platform. As described above, the NVIDIA Morpheus platform is an AI-enabled, cloud-native cybersecurity platform. The NVIDIA Morpheus platform is an open application framework that enables cybersecurity developers to create AI/ML pipelines for filtering, processing, and classifying large volumes of real-time data, allowing customers to continuously inspect network and server telemetry at scale. The NVIDIA Morpheus platform can provide information security to data centers to enable dynamic protection, real-time telemetry, and adaptive defenses for detecting and remediating cybersecurity threats. In at least one embodiment of FIG. 1B, DPU 152 extracts the data stored in host physical memory 148 and sends extracted data 147 to accelerated AI/ML pipeline 153 hosting ML detection system 154. In this embodiment, ML detection system 154 includes ransomware detection system 136, malicious URL detection system 138, DGA detection system 140, and optionally other malware detection systems 142 similar to ML detection system 134 of FIG. 1A.

In at least one embodiment, ML detection system 154 can output an indication 149 of classification by ML detection system 154. Indication 149 can be an indication of ransomware, an indication of malicious URL, an indication of DGA domain, an indication that one or more computer programs executed by host device 104 are subject to malicious activity, an indication of classification by other malware detection systems 142, or the like. In at least one embodiment, ML detection system 154 can send indication 149 to hardware-accelerated security service 122, and hardware-accelerated security service 122 can send an alert 151 to SIEM or XDR system 106. Alert 151 can include information about ransomware, malicious URLs, DGA domains, or the like. In at least one embodiment, ML detection system 154 can send indication 155 to SIEM or XDR system 106, in addition to or instead of sending indication 149 to hardware-accelerated security service 122.

In at least one embodiment, the one or more computer programs reside in a first computing domain (e.g., a host domain), and hardware-accelerated security service 122 and ML detection system 154 reside in a second computing domain (e.g., DPU domain) different than the first computing domain. In another embodiment, the one or more computer programs reside in a first computing domain (e.g., a host domain), hardware-accelerated security service 122 resides in a second computing domain (e.g., DPU domain), and ML detection system 154 reside in a third computing domain different than the first and second computing domains.

In at least one embodiment, the malicious activity is caused by malware, and hardware-accelerated security service 122 is out-of-band security software in a trusted domain that is different and isolated from the malware. That is, the malware may reside in a host domain, and hardware-accelerated security service 122, being in the trusted domain, can monitor the physical memory to detect the malware in the host domain. In at least one embodiment, DPU 152 includes a DMA controller (not illustrated in FIG. 1B) coupled to host interface 120. The DMA controller can read the data from host physical memory 148 via host interface 120. In at least one embodiment, the DMA controller reads data from host physical memory 148 using the PCIe technology. Alternatively, other technologies can be used to read data from host physical memory 148.

Additional details of ransomware detection system 136 are described below with respect to FIGS. 3A-4. Additional details of malicious URL detection system 138 are described below with respect to FIGS. 5A-7. Additional details of DGA detection system 140 are described below with respect to FIGS. 8A-10. Below are additional details of general operations of detecting malicious activity using either i) DPU 102, including hardware-accelerated security service 122 and ML detection system 134; or ii) DPU 152, including hardware-accelerated security service 122, and accelerated AI/ML pipeline 153 (also referred to as accelerated pipeline hardware), including ML detection system 154.

Figure 2:
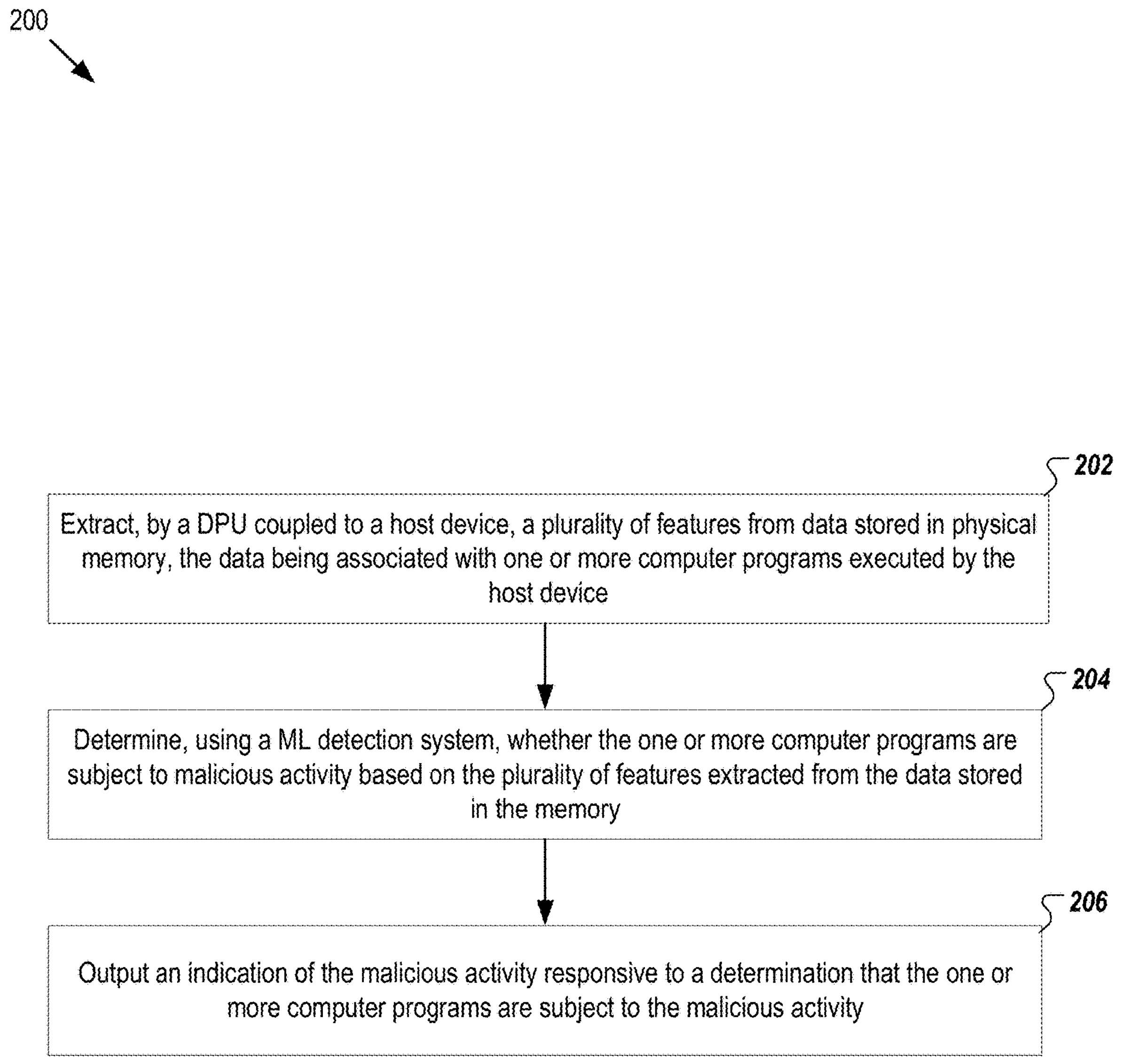
FIG. 2 is a flow diagram of an example method of malicious activity detection in data stored in memory associated with one or more computer programs executed by a host device, according to at least one embodiment.

FIG. 2 is a flow diagram of an example method 200 of malicious activity detection in data stored in memory associated with one or more computer programs executed by a host device, according to at least one embodiment. In at least one embodiment, method 200 may be performed by processing logic of DPU 102. In at least one embodiment, method 200 may be performed by processing logic of DPU 152 and processing logic of accelerated AI/ML pipeline 153. The processing logic can be a combination of hardware, firmware, software, or any combination thereof. Method 200 may be performed by one or more data processing units (e.g., DPUs, CPUs, and/or GPUs), which may include (or communicate with) one or more memory devices. In at least one embodiment, method 200 may be performed by multiple processing threads, each thread executing one or more individual functions, routines, subroutines, or operations of the method. In at least one embodiment, processing threads implementing method 200 may be synchronized (e.g., using semaphores, critical sections, and/or other thread synchronization logic). Alternatively, processing threads implementing method 200 may be executed asynchronously with respect to each other. Various operations of method 200 may be performed in a different order compared with the order shown in FIG. 2. Some operations of the methods may be performed concurrently with other operations. In at least one embodiment, one or more operations shown in FIG. 2 may not always be performed.

Referring to FIG. 2, the processing logic (of DPU 102, 152) extracts a plurality of features from data stored in memory associated with one or more computer programs executed by a host device (block 202). The processing logic determines, using a machine learning (ML) detection system (implemented on DPU 102 or accelerated AI/ML pipeline 153), whether the one or more computer programs are subject to malicious activity based on the plurality of features extracted from the data stored in the memory (block 204). The processing logic outputs an indication of the malicious activity responsive to a determination that the one or more computer programs are subject to the malicious activity (block 206).

In at least one embodiment, the one or more computer programs can be a host OS, an application, a guest OS, a guest application, or the like. The malicious activity detected at block 204 can be caused by ransomware, a malicious URL, DGA malware, or other malware described herein.

In at least one embodiment of ransomware, the processing logic obtains a series of snapshots of the data stored in the memory, each snapshot representing the data at a point in time. The processing logic extracts a set of features from different memory plugins from each snapshot of the series of snapshots. As described herein, the processing logic determines whether the malicious activity is caused by ransomware using a random-forest classification model of the ML detection system. The random-forest classification model can be a time-series-based model trained to classify the process as ransomware or non-ransomware using cascading of different numbers of snapshots in the series of snapshots, such as 3, 5, and 10 snapshots or other combinations of different numbers of snapshots.

In at least one embodiment of malicious URLs, the processing logic obtains a snapshot of the data stored in the memory, the snapshot representing the data at a point in time. The processing logic extracts a set of features from the snapshot, the set of features including words in a candidate URL, and numeric features of a URL structure of the candidate URL. The processing logic can tokenize the words into tokens. As described herein, the processing logic determines whether the malicious activity is caused by malicious URLs using a binary classification model of the ML detection system, the binary classification model being trained to classify the candidate URL as malicious or benign using the set of features. The binary classification model can include an embedding layer, an LSTM layer, and a fully connected neural network layer. The embedding layer can receive the tokens as an input sequence of tokens representing the words in the candidate URL and generate an input vector based on the input sequence of tokens. The LSTM layer is trained to generate an output vector based on the input vector. The fully connected neural network layer is trained to classify the candidate URL as malicious or benign using the output vector from the LSTM layer and the numeric features of the URL structure.

In at least one embodiment of DGA malware, the processing logic obtains a snapshot of the data stored in the memory, the snapshot representing the data at a point in time. The processing logic extracts a set of features from the snapshot, the set of features including domain characters in one or more candidate URLs. The processing logic can tokenize the domain characters into tokens. The ML detection system includes a two-stage classification model, including a binary classification model and a multi-class classification model. The binary classification model is trained to classify the one or more candidate URLs as having a DGA domain or a non-DGA domain in a first stage using the set of features. The multi-class classification model is trained to classify a DGA family of the DGA domain between a set of DGA families in a second stage using the set of features. The binary classification model in the first stage can include a CNN with an embedding layer to receive the tokens as an input sequence of tokens representing the domain characters in the one or more candidate URLs and generate an input vector based on the input sequence of tokens. The CNN is trained to classify the one or more candidate URLs as having the DGA domain or the non-DGA domain in the first stage using the input vector from the embedding layer. The multi-class classification model includes a Siamese network of the CNN with the embedding layer, the Siamese network being trained to classify the DGA family in the second stage using the input vector from the embedding layer.

Ransomware Detection

As described above, one type of malicious activity is caused by ransomware. In an example computing system, there can be many working ransomware, Trojans, or Remote Access Trojans (RATs) to monitor among hundreds of legitimate computer programs (also referred to as non-ransomware), such as antivirus software, compression software, cleaner software, drivers, scanners, editors, or the like. These computer programs create and run up to thousands of processes. By making observations using snapshots of these processes, a system could have, for example, 1,000 processes that are not considered ransomware and 1 or a few processes that are considered ransomware and they are encrypting the data of the system. An observation can be a snapshot of a process identifier (PID) (PID+Snapshot). In at least one embodiment, hardware-accelerated security service 122 is an active system for detecting ransomware activities in an operating system by constantly monitoring the physical memory of the host and virtual machines based on multiple plugins (also referred to as volatility plugin, memory plugin, or process plugin). The multiple plugins can extract information, such as a process list, network connections, kernel modules, or the like. The information can include indications that can be used for feature extraction by ML detection system 134 (or 154). The multiple plugins can be used to acquire a data dump of the host physical memory 148. The multiple plugins allow live-memory analysis (or real-time data analysis) of the host physical memory 148. The multiple plugins can acquire select data needed for a specific purpose, like building the process list. The multiple plugins allow a DMA controller on DPU 102 (or DPU 152) to access the host physical memory 148. The extracted data 147 by feature extraction logic 144 can be stored in memory 118 for analyzing by DPU 102 (or DPU 152 or accelerated AI/ML pipeline 153) without the malware being aware or being able to modify the data. In at least one embodiment, DPU 102 can process extracted data 147 and extract features or indications from extracted data 147 before sending to ML detection system 134 (or 154). DPU 102 (or DPU 152) can collect real-time data using out-of-band memory acquisitions using hardware-accelerated security service 122. DPU 102 can integrate ransomware detection system 136 with the real-time data collected by hardware-accelerated security service 122 to detect ransomware in host physical memory 148.

In at least one embodiment, data extraction logic 146 can take a snapshot of host physical memory 148 and record data from multiple plugins serially for each snapshot. In each streaming snapshot, ML detection system 134 (or 154) receives data from multiple memory plugins. The plugins can include LdrModules, VadInfo, Handles, ThreadList, Envars, or the like. The ThreadList plugin can provide information about a list of threads and their states, like running, pending, stopped (e.g., reason stopped working). LdrModules plugin can provide information of hiding or injecting types of activity in a process. Handles plugin can provide information about handles in processes, handle tables, pointers, and files, keys, threads, or processes that have handles. VadInfo plugin can provide information about virtual address descriptors (VAD). Envars plugins can provide information about environment variables.

In at least one embodiment, each snapshot takes multiple seconds (e.g., 4 seconds). Feature extraction logic 144 can extract features (e.g., 100 dominant features) from each snapshot. For reference, 99% of ransomware takes 8 seconds or more to encrypt a machine, 97% of ransomware takes 12 seconds or more to encrypt a machine, 87% of ransomware takes 20 seconds or more to encrypt a machine, and 55% of ransomware takes 40 seconds or more to encrypt a machine. In at least one embodiment, data extraction logic 146 can take two or more snapshots for the 99% of ransomware, three or more snapshots for the 97% of ransomware, five or more snapshots for the 87% of ransomware, and ten or more snapshots for the 55% of ransomware.

In at least one embodiment, feature extraction logic 144 can extract various features from the LdrModules plugin, including, for example: ldrmodules_df_size_int In at least one embodiment, feature extraction logic 144 can extract various features from the Envars plugin (most of the system processes have less than 35 environment variables, whereas malware processes have more environment variables), including, for example: envars_pathext: .COM, EXE, .BAT, .CMD, .VBS, .VBE, .JS, .JSE, .WSF, .WSH, .MSC, .CPL, and envars_df_count.

In at least one embodiment, feature extraction logic 144 can extract various features from the VadInfo plugin, including, for example: get_commit_charge_max_vad, page_noaccess_vad_ratio, count_entire_commit_charge_vads, get_commit_charge_min_vad_page_noaccess, page_noaccess_count, page_readonly_vads_count, ratio_private_memory, page_noaccess_vad_count, get_commit_charge_mean_vad, vad_ratio, get_commit_charge_max_page_noaccess, get_commit_charge_mean_page_execute_readwrite, get_commit_charge_mean_vad_page_noaccess, get_commit_charge_max_page_execute_readwrite, get_commit_charge_min_vads, page_readonly_vad_ratio, page_readwrite_ratio, page_noaccess_ratio, or the like.

In at least one embodiment, feature extraction logic 144 can extract various features from the ThreadList plugin, including, for example: threadlist_df_wait_reason_9 (e.g., 25% of the ransomware has this feature greater than zero), threadlist_df_wait_reason_31 (e.g., 25% of the ransomware has this feature is greater than zero), threadlist_df_state_2, threadlist_df_state_unique, threadlist_df_wait_reason_13.

In at least one embodiment, feature extraction logic 144 can extract various features from the Handles plugin, including, for example: double_extension_len_handles, count_double_extension_count_handles, check_doc_file_handle_count, handles_df_section_ratio, handles_df_waitcompletionpacket_count, handles_df_directory_count, handles_df_section_count, handles_df_tpworkerfactory_count, handles_df_directory_ratio, handles_df_semaphore_ratio, handles_df_mutant_ratio, handles_df_event_ratio, handles_df_tpworkerfactory_ratio, handles_df_file_count, handles_df_iocompletion_ratio, handles_df_thread_ratio, handles_df_key_ratio, handles_df_iocompletionreserve_ratio, handles_df_file_ratio, handles_df_waitcompletionpacket_ratio, file_users_exists, handles_df_semaphore_count, handles_df_iocompletionreserve_count, handles_df_mutant_count, handles_df_event_count, handles_df_key_count, file_windows_count, handles_df_name_unique.

In at least one embodiment, feature extraction logic 144 can extract an extension count of files (count_double_extension_count) that identifies how many files are duplicate files but with different extensions (e.g., copy.docx and copy.docx.donut).

In at least one embodiment, once feature extraction logic 144 has extracted a set of two or more snapshots of features (different N-snapshots), the different number of snapshots are fed into ransomware detection system 136. In at least one embodiment, ransomware detection system 136 includes a random-forest classification model trained to classify processes between ransomware and non-ransomware, as illustrated in FIG. 3A.

Figure 3A:
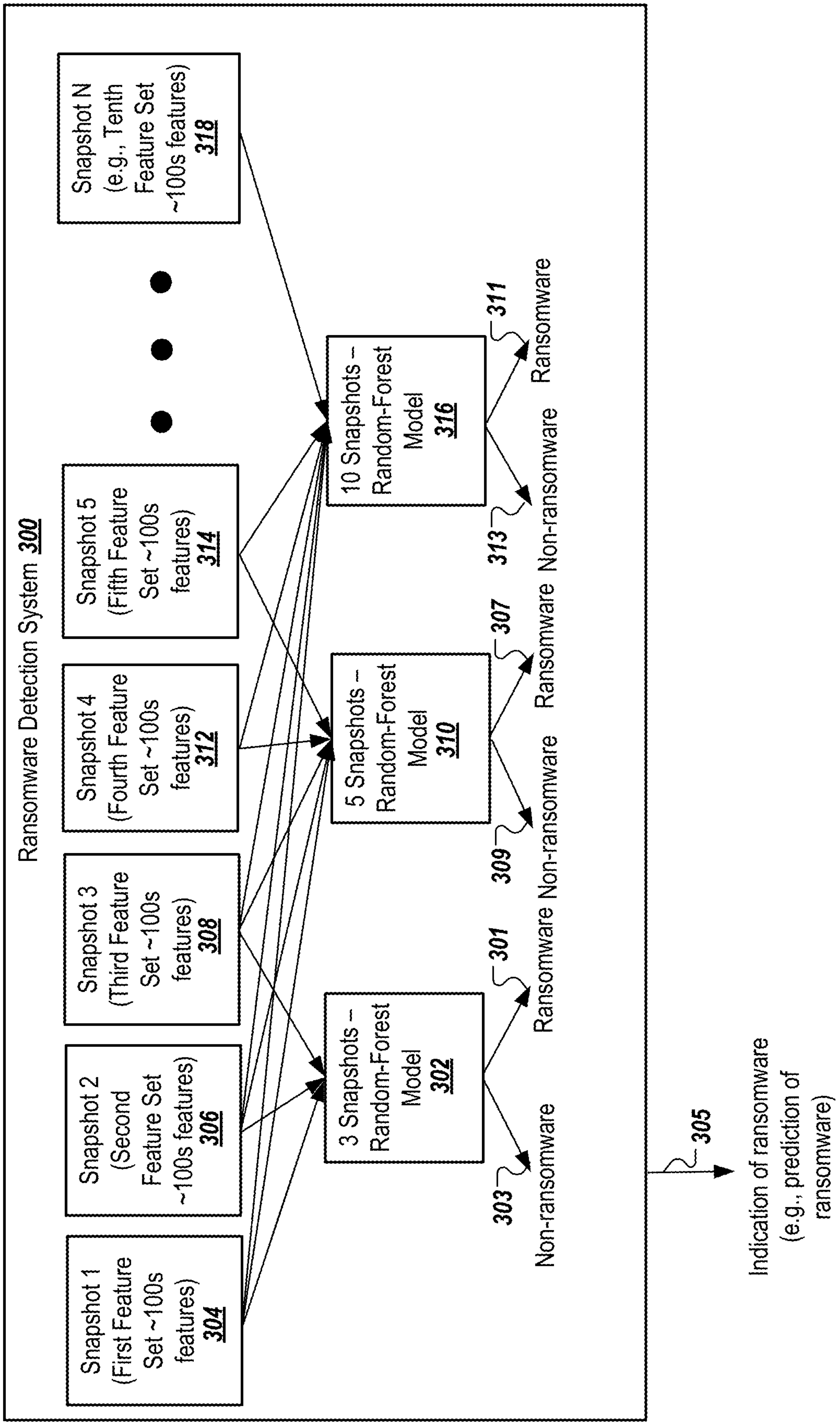
FIG. 3A is a diagram of an example random-forest classification model, according to at least one embodiment.

FIG. 3A is a diagram of an example random-forest classification model 300, according to at least one embodiment. Random-forest classification model 300 gets the streaming snapshots of features from the plugins in real-time. In at least one embodiment, random-forest classification model 300 extracts from each snapshot a set of features using feature extraction logic 144. In another embodiment, random-forest classification model 300 receives the feature sets from feature extraction logic 144. Random-forest classification model 300 is a time-series-based model that uses cascading of different numbers of snapshots to classify processes between ransomware and non-ransomware. In the illustrated embodiment, three, five, and ten snapshots are used to classify the processes.

In at least one embodiment, a first random-forest classification model 302 receives a first feature set in a first snapshot 304, a second feature set in a second snapshot 306, and a third feature set in a third snapshot 308. First random-forest classification model 302 classifies a process as ransomware 301 or non-ransomware 303 using the feature sets from these snapshots 304-308. In at least one embodiment, first random-forest classification model 302 can output an indication of ransomware 305 responsive to the process being classified as ransomware 301. The indication of ransomware 305 can specify a level of confidence that the process corresponds to the ransomware class. The level of confidence can be a prediction percentage of being ransomware. For example, if the level of confidence satisfies a level of confidence criterion (e.g., a confidence threshold), first random-forest classification model 302 can classify the process as ransomware 301. Alternatively, first random-forest classification model 302 can output an indication of non-ransomware responsive to the process being classified as non-ransomware 303. The indication of non-ransomware can indicate a level of confidence that the process corresponds to the non-ransomware class. In this embodiment, first random-forest classification model 302 is used as a first stage of multiple stages in the time-series-based model (random-forest classification model 300).

In at least one embodiment, a second random-forest classification model 310 receives the features sets from the three snapshots 304-308 used by first random-forest classification model 302, and a fourth feature set in a fourth snapshot 312, and a fifth feature set in a fifth snapshot 314. Second random-forest classification model 310 classifies a process as ransomware 307 or non-ransomware 309 using the feature sets from five snapshots 304-308 and 312-314. In at least one embodiment, second random-forest classification model 310 can output an indication of ransomware 305 responsive to the process being classified as ransomware 307. The indication of ransomware 305 can specify a level of confidence that the process corresponds to the ransomware class. Alternatively, second random-forest classification model 310 can output an indication of non-ransomware responsive to the process being classified as non-ransomware 303, and a level of confidence that the process corresponds to the non-ransomware class. In this embodiment, second random-forest classification model 310 is used as a second stage in the time-series-based model (random-forest classification model 300).

In at least one embodiment, a third random-forest classification model 316 receives the features sets from the five snapshots 304-308 and 312-314 used by second random-forest classification model 310, and features sets from four additional snapshots, including a tenth snapshot 318. Third random-forest classification model 316 classifies a process as ransomware 311 or non-ransomware 313 using the feature sets from ten snapshots 304-308, 312-314, and 318. In at least one embodiment, third random-forest classification model 316 can output an indication of ransomware 305 responsive to the process being classified as ransomware 307. The indication of ransomware 305 can specify a level of confidence that the process corresponds to the ransomware class. Alternatively, second random-forest classification model 310 can output an indication of non-ransomware responsive to the process being classified as non-ransomware 303, and a level of confidence that the process corresponds to the non-ransomware class. In this embodiment, third random-forest classification model 316 is used as a third stage in the time-series-based model (random-forest classification model 300).

In at least one embodiment, ransomware detection system 136 can output an indication of ransomware 305 responsive to the process being classified as ransomware 307. The indication of ransomware 305 can specify a level of confidence that the process corresponds to the ransomware class. Alternatively, ransomware detection system 136 can output an indication of non-ransomware responsive to the process being classified as non-ransomware 303, and a level of confidence that the process corresponds to the non-ransomware class.

In at least one embodiment, a different number of snapshots in the series can be used other than 3, 5, and 10. In at least one embodiment, a first number of snapshots can be obtained over a first amount of time, a second number of snapshots can be obtained over a second amount of time that is greater than the first amount of time and so forth. The different numbers of snapshots are cascading by a subsequent number of snapshots, which include the previous snapshots. Similarly, a third number of snapshots can be obtained over a third amount of time that is greater than the second amount of time, and the third number of snapshots include the second number of snapshots.

Figure 3B:
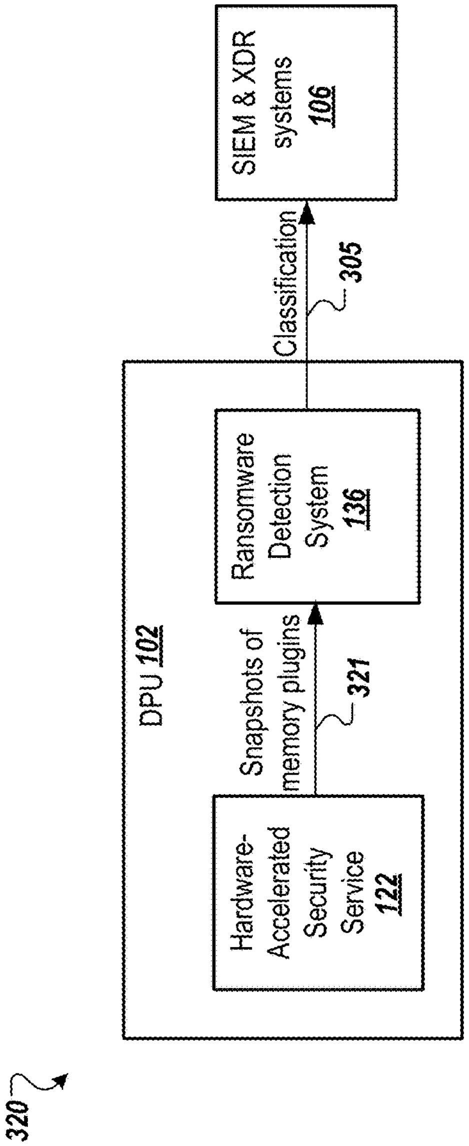
FIG. 3B is a block diagram of an example system architecture for the ransomware detection system, according to at least one embodiment.
Figure 3C:
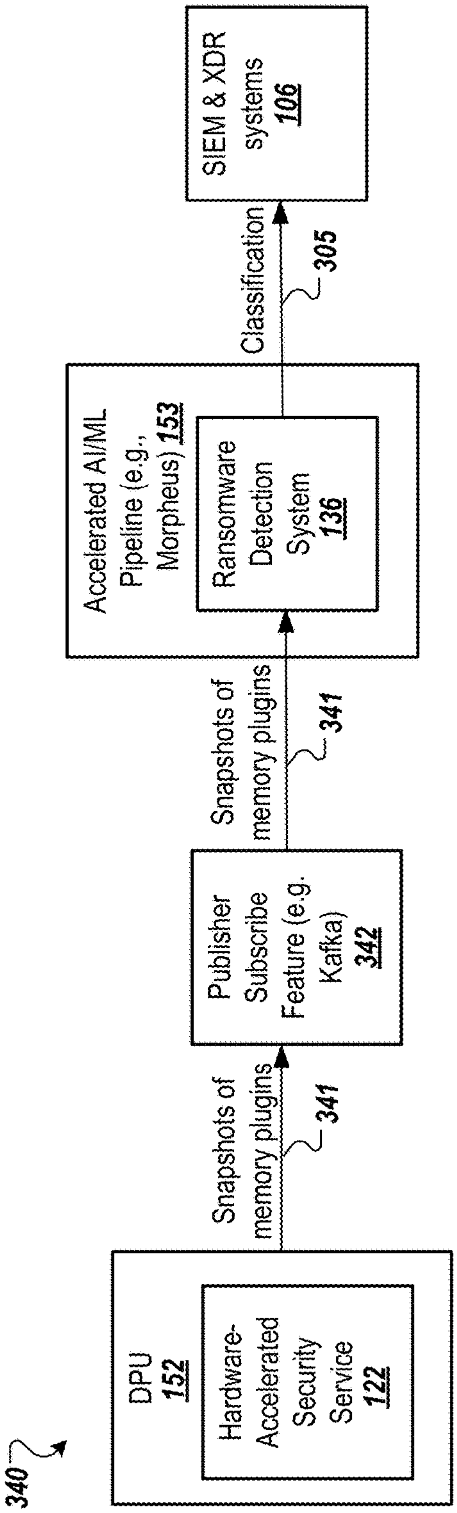
FIG. 3C is a block diagram of an example system architecture for the ransomware detection system, according to at least one embodiment.

As described above, ML detection models, such as the random-forest classification model 300, can be deployed in ransomware detection system 136 residing in DPU 102, as described in more detail with respect to FIG. 3B, or in ransomware detection system 136 residing in accelerated AI/ML pipeline 153, as described in more detail with respect to FIG. 3C.

FIG. 3B is a block diagram of an example system architecture 320 for the ransomware detection system 136, according to at least one embodiment. In system architecture 320, DPU 102 hosts hardware-accelerated security service 122 and ransomware detection system 136. Hardware-accelerated security service 122 extracts snapshots of memory plugins 321, as described above with respect to FIG. 3A, and sends, or otherwise makes available, snapshots of memory plugins 321 to ransomware detection system 136. Ransomware detection system 136, using random-forest classification model 300, classifies one or more processes as ransomware or non-ransomware and outputs an indication of ransomware 305 (or indication of non-ransomware) to SIEM or XDR system 106 for further actions by SIEM or XDR system 106. SIEM or XDR system 106 can monitor and show results of classifications of ransomware, such as on a dashboard displayed to a user or operator of SIEM or XDR system 106.

FIG. 3C is a block diagram of an example system architecture 340 for the ransomware detection system, according to at least one embodiment. In system architecture 340, DPU 152 hosts hardware-accelerated security service 122 and accelerated AI/ML pipeline 153 hosts ransomware detection system 136. Hardware-accelerated security service 122 extracts snapshots of memory plugins 341, as described above with respect to FIG. 3A, and sends, or otherwise makes available, snapshots of memory plugins 341 to a publish subscribe feature 342 (e.g., Kafka). Publish subscribe feature 342 sends, or otherwise makes available, snapshots of memory plugins 341 to ransomware detection system 136. Ransomware detection system 136, using random-forest classification model 300, classifies one or more processes as ransomware or non-ransomware and outputs an indication of ransomware 305 (or indication of non-ransomware) to SIEM or XDR system 106 for further actions by SIEM or XDR system 106.

Figure 4:
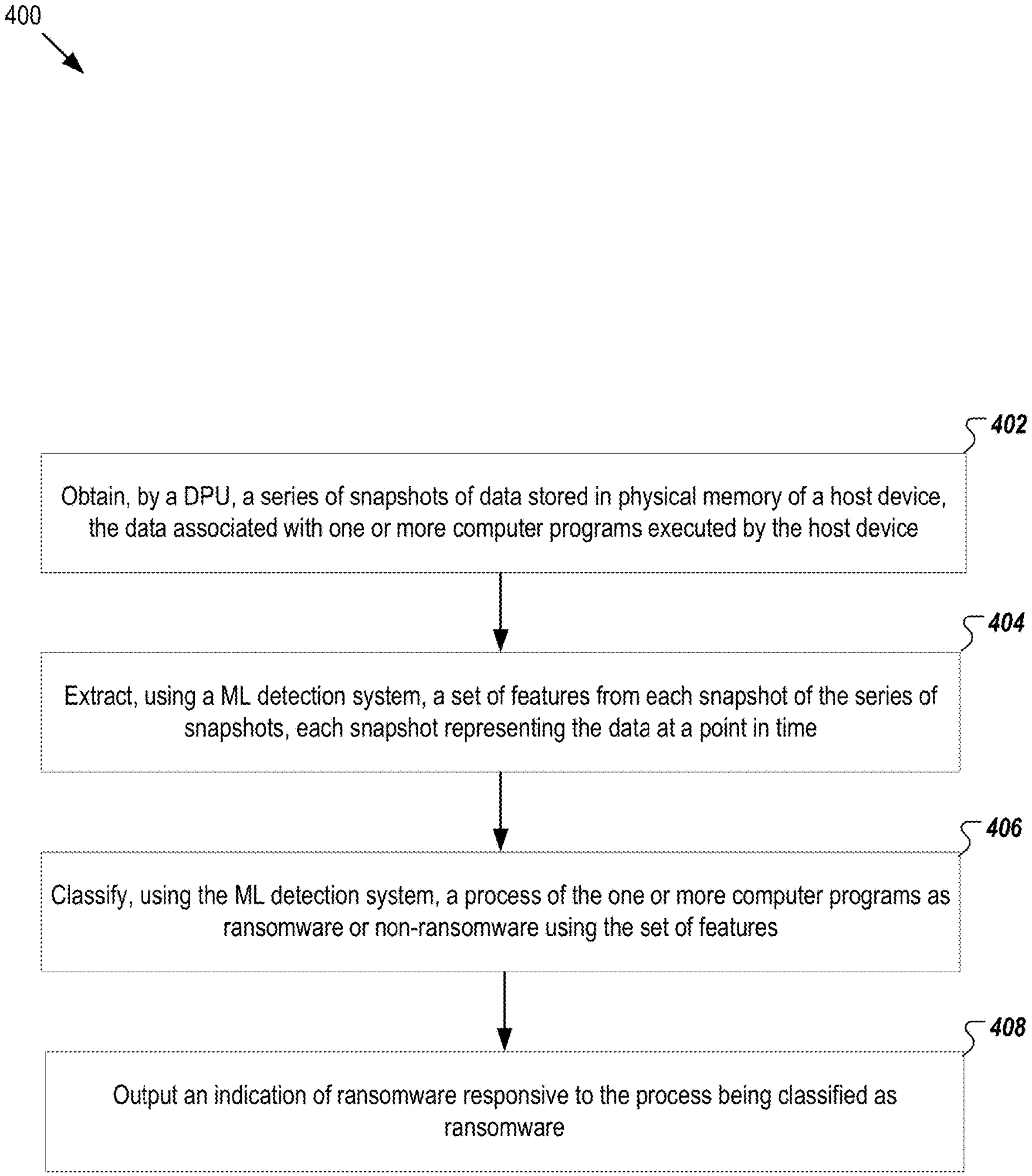
FIG. 4 is a flow diagram of an example method of ransomware detection using a random-forest classification model, according to at least one embodiment.

FIG. 4 is a flow diagram of an example method 400 of ransomware detection using a random-forest classification model, according to at least one embodiment. In at least one embodiment, method 400 may be performed by processing logic of DPU 102. In at least one embodiment, method 400 may be performed by processing logic of DPU 152 and processing logic of accelerated AI/ML pipeline 153. In at least one embodiment, method 400 may be performed by processing logic of ransomware detection system 136 of FIGS. 1A-1B, 3A-3B. The processing logic can be a combination of hardware, firmware, software, or any combination thereof. Method 400 may be performed by one or more data processing units (e.g., DPUs, CPUs, and/or GPUs), which may include (or communicate with) one or more memory devices. In at least one embodiment, method 400 may be performed by multiple processing threads, each thread executing one or more individual functions, routines, subroutines, or operations of the method. In at least one embodiment, processing threads implementing method 400 may be synchronized (e.g., using semaphores, critical sections, and/or other thread synchronization logic). Alternatively, processing threads implementing method 400 may be executed asynchronously with respect to each other. Various operations of method 400 may be performed in a different order compared with the order shown in FIG. 4. Some operations of the methods may be performed concurrently with other operations. In at least one embodiment, one or more operations shown in FIG. 4 may not always be performed.

Referring to FIG. 4, the processing logic obtains a series of snapshots of data stored in the physical memory of a host device, the data being associated with one or more computer programs executed by the host device (block 402). The processing logic extracts, using an ML detection system, a set of features from each snapshot of the series of snapshots, each snapshot representing the data at a point in time (block 404). The processing logic classifies, using the ML detection system, a process of the one or more computer programs as ransomware or non-ransomware using the set of features (block 406). The processing logic outputs an indication of ransomware responsive to the process being classified as ransomware (block 408).

In a further embodiment, the ML detection system includes a random-forest classification model (e.g., 300). The random-forest classification model is a time-series-based model trained to classify a process as ransomware or non-ransomware using cascading of different numbers of snapshots in the series of snapshots. In at least one embodiment, the cascading of different numbers of snapshots includes a first number of snapshots obtained over a first amount of time and a second number of snapshots obtained over a second amount of time greater than the first amount of time, the second number of snapshots including the first number of snapshots. In a further embodiment, the cascading of different numbers of snapshots includes a third number of snapshots obtained over a third amount of time greater than the second amount of time, the third number of snapshots including the second number of snapshots.

In another embodiment, the ML detection system includes a time-based classification model trained to classify a process as ransomware or non-ransomware using different features sets over different amounts of time. In at least one embodiment, the different feature sets include a first set of snapshots, representing the data stored in the physical memory over a first period, and a second set of snapshots, representing the data stored in the physical memory over a second period greater than the first period. In a further embodiment, the different feature sets further include a third set of snapshots, representing the data stored in the physical memory over a third period greater than the second period. In other embodiments, processing logic can perform other operations described above with respect to ransomware detection system 136.

Other Malware Detection

As described above, one type of malicious activity is caused by malware. As described above, data extraction logic 146 can take a snapshot of host physical memory 148 and record data from multiple plugins serially for each snapshot. In each streaming snapshot, ML detection system 134 (or 154) receives data from multiple memory plugins. In at least one embodiment, feature extraction logic 144 can extract a set of features from the one or more snapshots. In at least one embodiment, once feature extraction logic 144 has extracted a set of features, the features are fed into other malware detection systems 142. In at least one embodiment, other malware detection systems 142 includes one or more ML models trained to classify a process of the one or more computer programs as malware or non-malware using the set of features.

Malicious URLs Detection

As described above, one type of malicious activity is caused by malicious URLs. As described above, data extraction logic 146 can take a snapshot of host physical memory 148 and record data from multiple plugins serially for each snapshot. In each streaming snapshot, ML detection system 134 (or 154) receives data from multiple memory plugins. In at least one embodiment, feature extraction logic 144 can extract one or more candidate URLs from one or more snapshots. In at least one embodiment, once feature extraction logic 144 has extracted a candidate URL, the candidate URL is fed into malicious URL detection system 138. In at least one embodiment, malicious URL detection system 138 includes a binary classification model trained to classify the candidate URL as malicious or benign, as illustrated in FIG. 5A.

Figure 5A:
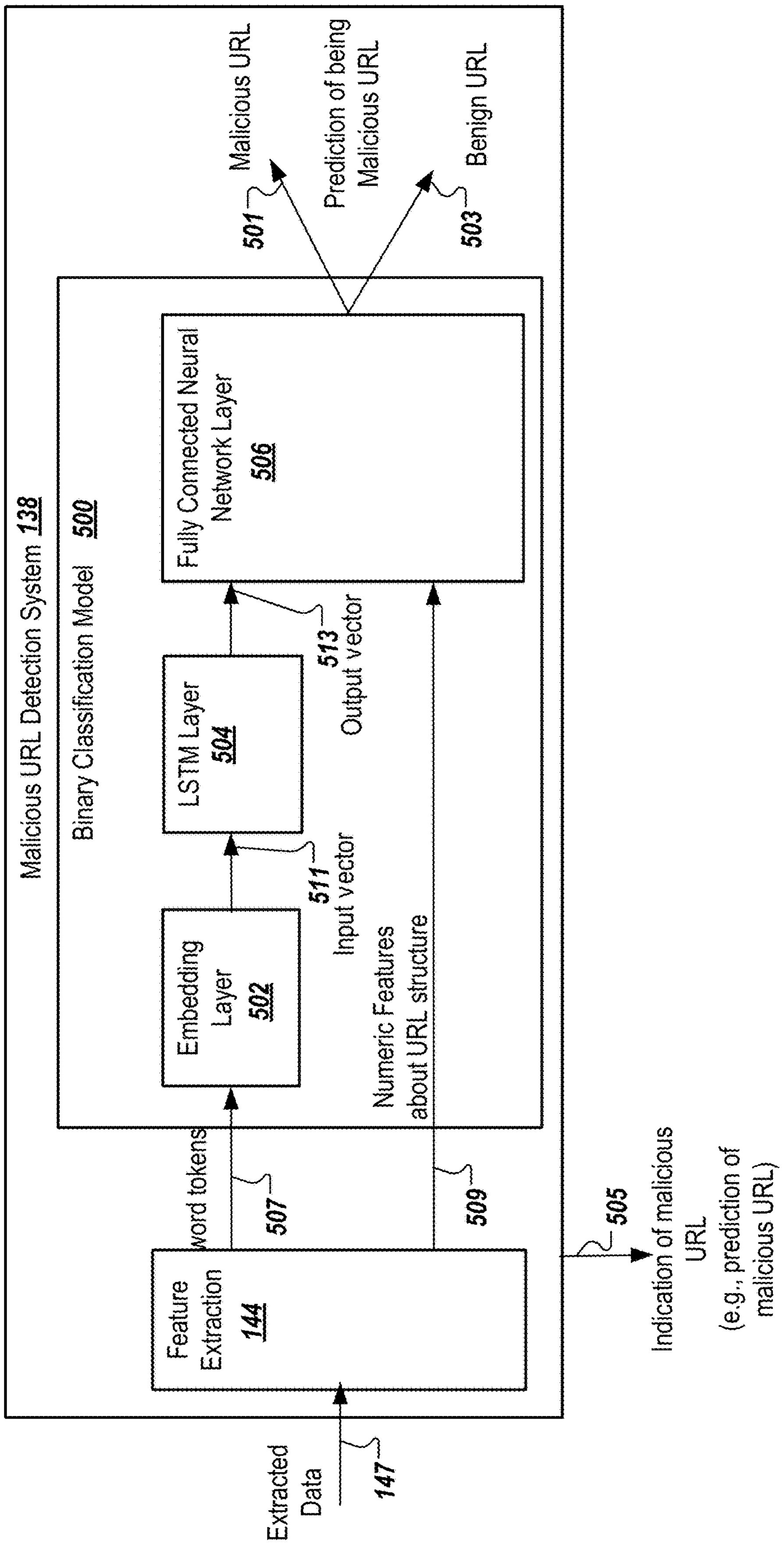
FIG. 5A is a block diagram of an example malicious uniform resource locator (URL) detection system, according to at least one embodiment.
Figure 6:
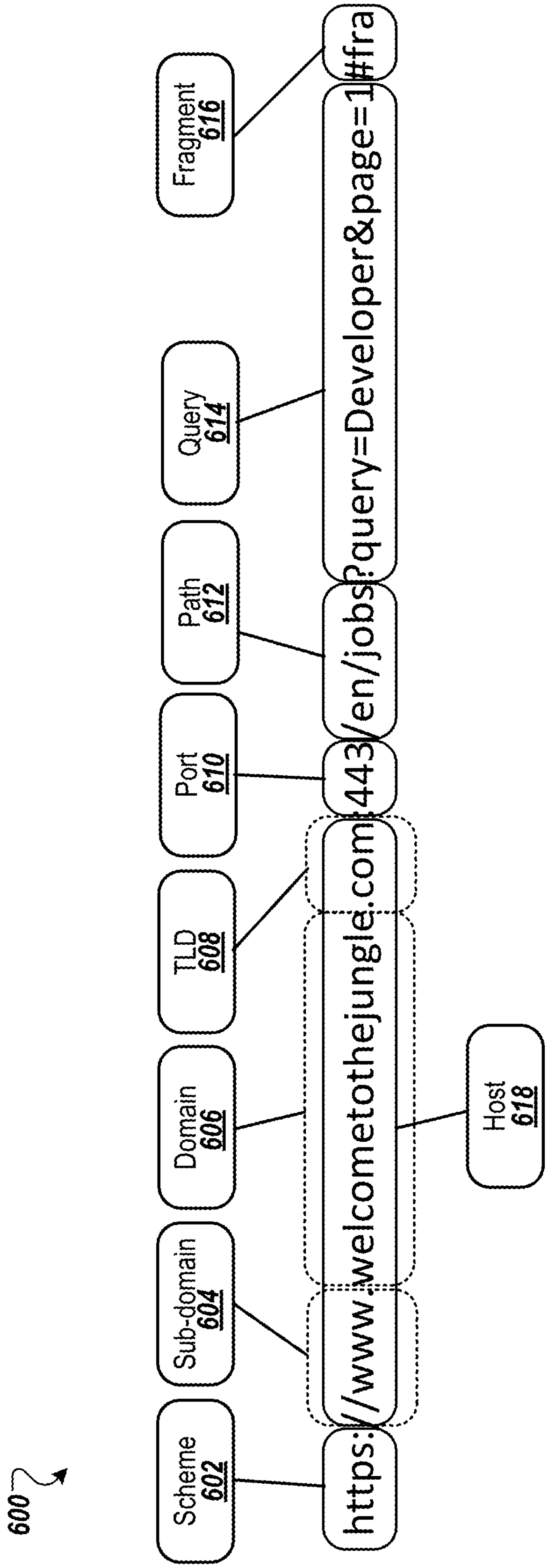
FIG. 6 illustrates URL structures of a candidate URL, according to at least one embodiment.

FIG. 5A is a block diagram of an example malicious URL detection system 138, according to at least one embodiment. Malicious URL detection system 138 includes feature extraction logic 144 and binary classification model 500 trained to classify a candidate URL as malicious or benign using a set of features. Feature extraction logic 144 receives extracted data 147 and extracts one or more candidate URLs from extracted data 147. For binary classification model 500, feature extraction logic 144 extracts word features and numeric features of a candidate URL. In at least one embodiment, feature extraction logic 144 can tokenize the words in the candidate URL into word tokens 507 and determine numeric features 509 of a URL structure, such as illustrated in FIG. 6. Feature extraction logic 144 can provide word tokens 507 and numeric features 509 to binary classification model 500, which is trained to classify the candidate URL as malicious 501 or benign 503 using word tokens 507 and numeric features 509. In at least one embodiment, feature extraction logic 144 can clean the text of the candidate URL, for example, by removing slashes, punctuation, words that are less than three characters, words that are greater than a specified number of characters (e.g., 15 characters), or the like. Feature extraction logic 144 can determine a presence of a port, a count of a number of domains, a count of a number of TLDs, a length of each word, or the like. In at least one embodiment, feature extraction logic 144 can extract a set of numerical features 509 (e.g., 20 numeric features) about the URL structure in addition to word tokens 507.

In at least one embodiment, feature extraction logic 144 can extract candidate URLs with text regex (regular expression) functionality. For example, feature extraction logic 144 can extract candidate URLs from data heaps using dynamic allocations, e.g., malloc( )), stacks using static allocations (e.g., Char arr[ ]="STRING"). In another embodiment, feature extraction logic 144 can extract from Vadtree information from the VadInfo plugin.

In at least one embodiment, binary classification model 500 includes an embedding layer 502, an LSTM layer 504, and a fully connected neural network layer 506. Embedding layer 502 can receive word tokens 507 as an input sequence of tokens representing the words in the candidate URL. Embedding layer 502 can generate an input vector 511 based on the input sequence of tokens. An input vector 511 can include one embedding for each word and represent word tokens 507 in a representation of words different than the input sequence. Input vector 511 can represent the words in the candidate URL in a vector space used by LSTM layer 504. LSTM layer 504 can receive input vector 511 and generate an output vector 513 based on input vector 511. Fully connected neural network layer 506 can receive output vector 513 from LSTM layer 504 and numeric features 509. Fully connected neural network layer 506 is trained to classify the candidate URL as a malicious 501 or benign 503 using output vector 513 from the LSTM layer 504 and the numeric features 509 of the URL structure. In at least one embodiment, fully connected neural network layer 506 can determine a level of confidence that the candidate URL corresponds to the malicious class. The level of confidence can be a prediction percentage of being malicious. For example, if the level of confidence satisfies a level of confidence criterion (e.g., a confidence threshold), Fully connected neural network layer 506 can classify the candidate URL as malicious 501.

In at least one embodiment, malicious URL detection system 138 can output an indication of a malicious URL 505 responsive to the candidate URL being classified as malicious 501. The indication of a malicious URL 505 can specify the level of confidence that the candidate URL corresponds to the malicious class. Alternatively, malicious URL detection system 138 can output an indication of a benign URL responsive to the candidate URL being classified as benign 503. The indication of a benign URL can indicate a level of confidence that the candidate URL is benign.

Figure 5B:
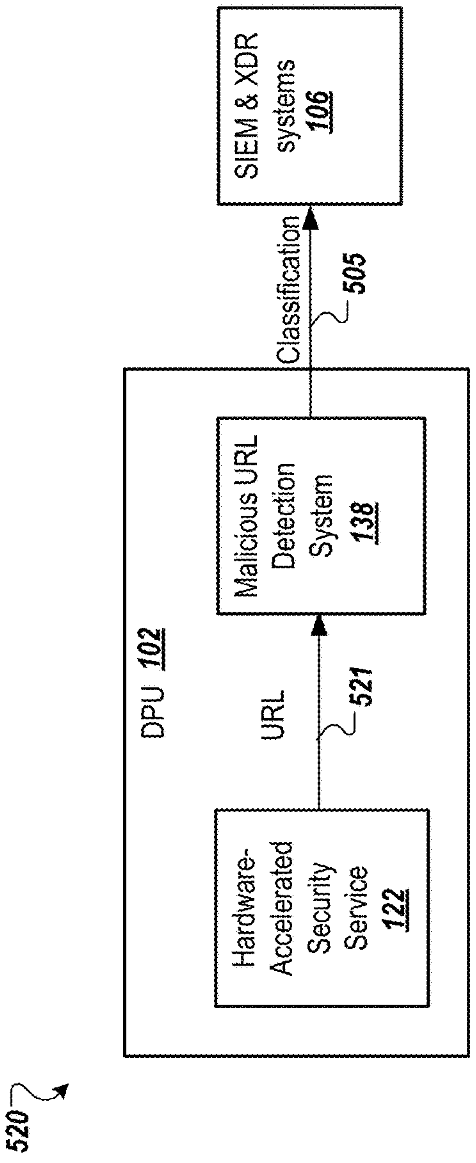
FIG. 5B is a block diagram of an example system architecture for the malicious URL detection system, according to at least one embodiment.
Figure 5C:
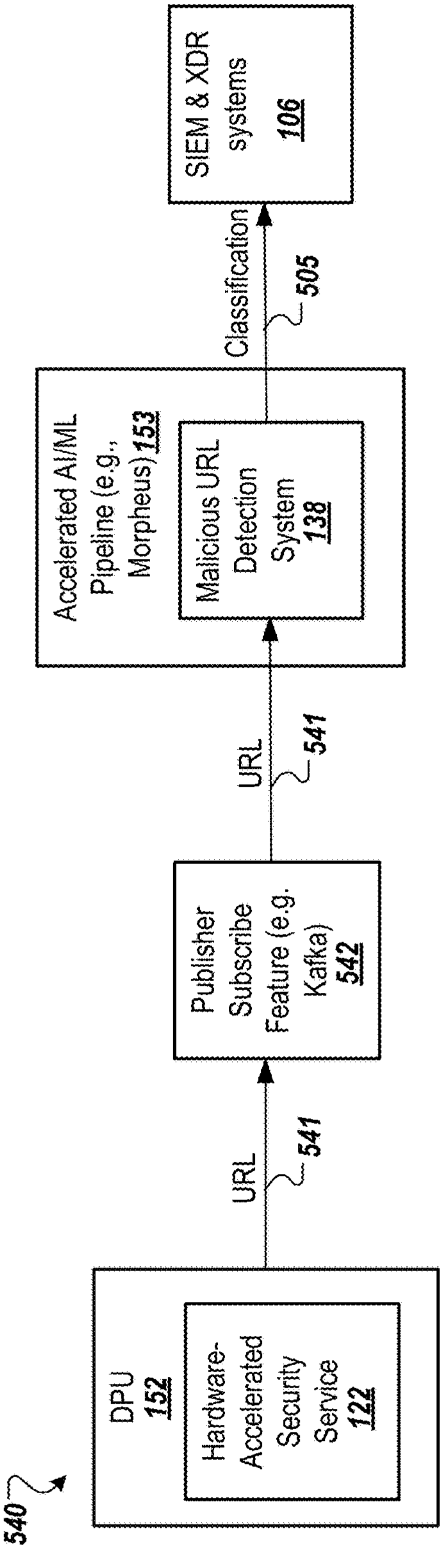
FIG. 5C is a block diagram of an example system architecture for the malicious URL detection system, according to at least one embodiment.

As described above, ML detection models, such as the binary classification model 500, can be deployed in malicious URL detection system 138 residing in DPU 102, as described in more detail with respect to FIG. 5B, or in malicious URL detection system 138 residing in accelerated AI/ML pipeline 153, as described in more detail with respect to FIG. 5C.

FIG. 5B is a block diagram of an example system architecture 520 for the malicious URL detection system 138, according to at least one embodiment. In system architecture 520, DPU 102 hosts hardware-accelerated security service 122 and malicious URL detection system 138. Hardware-accelerated security service 122 extracts snapshots of memory plugins 321, as described above with respect to FIG. 3A. Hardware-accelerated security service 122 can extract a candidate URL 521 from any one or more of the snapshots of memory plugins and send, or otherwise make available, candidate URL 521 to malicious URL detection system 138. In another embodiment, Hardware-accelerated security service 122 extracts snapshots of memory plugins 321, as described above with respect to FIG. 3A, and sends snapshots of memory plugins 321 to malicious URL detection system 138 and malicious URL detection system 138 extracts candidate URL 521, such as illustrated in FIG. 5A. Malicious URL detection system 138, using binary classification model 500, can classify candidate URL 521 as malicious or benign and output an indication of malicious URL 505 (or indication of benign URL) to SIEM or XDR system 106 for further actions by SIEM or XDR system 106. SIEM or XDR system 106 can monitor and show results of classifications of malicious URLs, such as on a dashboard displayed to a user or operator of SIEM or XDR system 106.

FIG. 5C is a block diagram of an example system architecture 540 for the malicious URL detection system 138, according to at least one embodiment. In system architecture 540, DPU 152 hosts hardware-accelerated security service 122 and accelerated AI/ML pipeline 153 hosts malicious URL detection system 138. Hardware-accelerated security service 122 extracts candidate URL 521, as described above with respect to FIG. 3A, and sends, or otherwise makes available, candidate URL 521 to a publish subscribe feature 542 (e.g., Kafka). Publish-subscribe feature 542 sends, or otherwise makes available, candidate URL 521 to malicious URL detection system 138. Malicious URL detection system 138, using binary classification model 500, can classify candidate URL 521 as malicious or benign and output an indication of malicious URL 505 (or indication of benign URL) to SIEM or XDR system 106 for further actions by SIEM or XDR system 106.

As described above with respect to FIGS. 5A-5C, feature extraction logic 144 can extract candidate URLs and extract features from the candidate URLs, including words in the candidate URL and numeric features of a URL structure of the candidate URL, such as illustrated in candidate URL 600 of FIG. 6.

FIG. 6 illustrates URL structures of a candidate URL 600, according to at least one embodiment. Candidate URL 600 includes words, numbers, characters, and punctuation organized in a URL structure. A URL structure of candidate URL 600 can include a scheme 602, a sub-domain 604, a domain 606, a TLD 608, a Port 610, a Path 612, a Query 614, a Fragment 616. Sub-domain 604, domain 606, and TLD 608 can make up a host domain 618. Candidate URLs can include other URL structures like second-level domains, subdirectories, or the like. When extracting features, feature extraction logic 144 can analyze each URL structure and extract a word, if any, a length of the word and/or URL structure, a position of the URL structure, a count of the URL structure (e.g., when there are two TLDs, for example), an indication of a presence of a URL structure (e.g., an indication of a port in the URL structure), or the like. Feature extraction logic 144 can tokenize words extracted from candidate URL 600 (e.g., https, www, welcometothejungle, jobs, Developer, page, fra) and remove slashes and other punctuation between potential words. Feature extraction logic 144 can remove words over a specified length, such as welcometothejungle, or can reduce longer words to smaller words, such as welcome, the, and jungle. Feature extraction logic 144 can output a sequence of tokens representing the words and numeric features about the URL structure for input into binary classification model 500. The tokens of the words can be processed by embedding layer 502 to convert it to a vector space used by LSTM layer 504. Fully connected neural network layer 506 can use an output of LSTM layer 504 and numeric features of the URL structure to classify candidate URL 600 as malicious 501 or benign 503.

Figure 7:
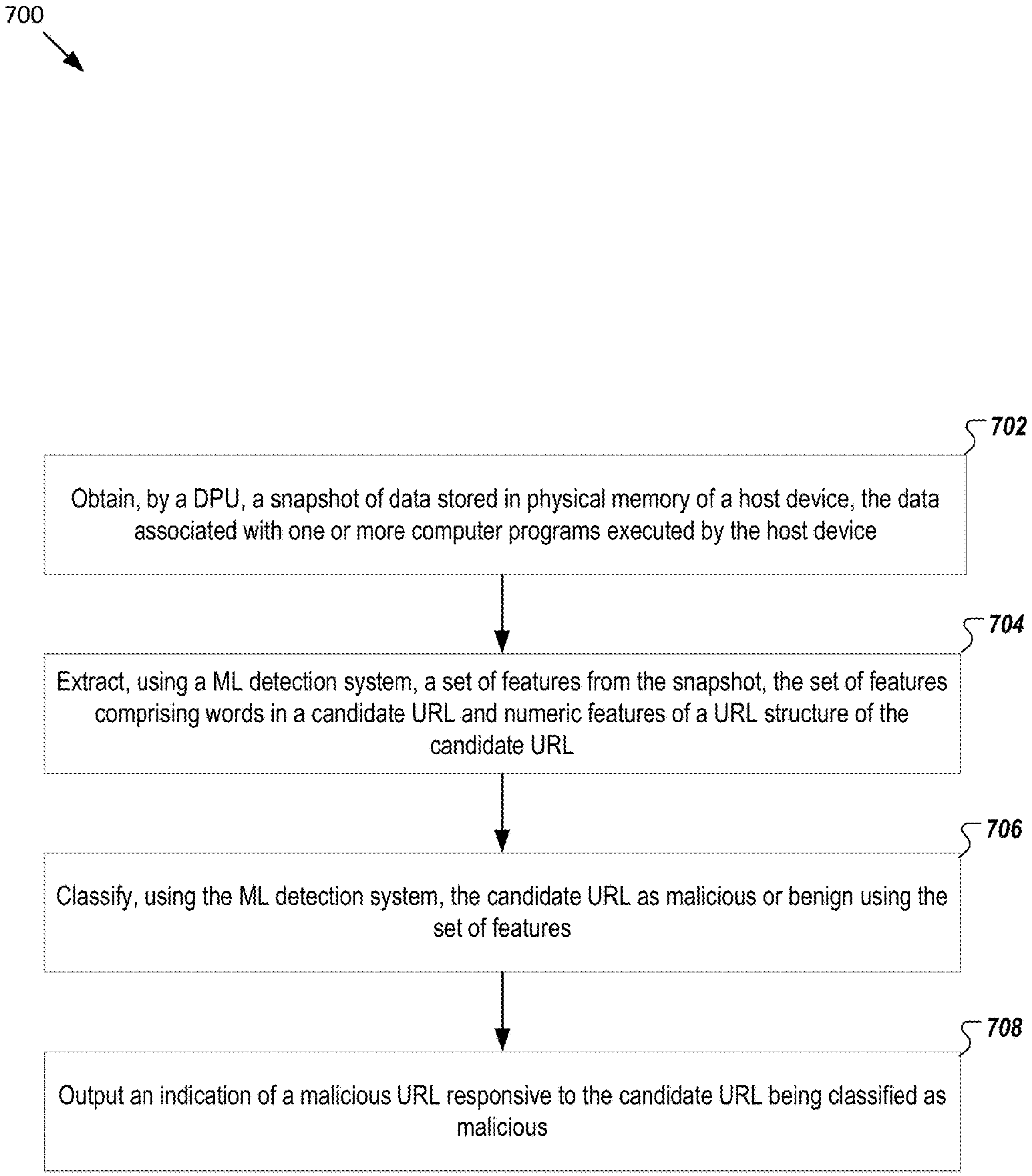
FIG. 7 is a flow diagram of an example method of malicious URL detection using a binary classification model, according to at least one embodiment.

FIG. 7 is a flow diagram of an example method 700 of malicious URL detection using a binary classification model, according to at least one embodiment. In at least one embodiment, method 700 may be performed by processing logic of DPU 102. In at least one embodiment, method 700 may be performed by processing logic of DPU 152 and processing logic of accelerated AI/ML pipeline 153. In at least one embodiment, method 700 may be performed by processing logic of malicious URL detection system 138 of FIGS. 1A-1B, 5A-5B. The processing logic can be a combination of hardware, firmware, software, or any combination thereof. Method 700 may be performed by one or more data processing units (e.g., DPUs, CPUs, and/or GPUs), which may include (or communicate with) one or more memory devices. In at least one embodiment, method 700 may be performed by multiple processing threads, each thread executing one or more individual functions, routines, subroutines, or operations of the method. In at least one embodiment, processing threads implementing method 700 may be synchronized (e.g., using semaphores, critical sections, and/or other thread synchronization logic). Alternatively, processing threads implementing method 700 may be executed asynchronously with respect to each other. Various operations of method 700 may be performed in a different order compared with the order shown in FIG. 7. Some operations of the methods may be performed concurrently with other operations. In at least one embodiment, one or more operations shown in FIG. 7 may not always be performed.

Referring to FIG. 7, the processing logic obtains a snapshot of data stored in the physical memory of a host device, the data being associated with one or more computer programs executed by the host device (block 702). The processing logic extracts, using an ML detection system, a set of features from the snapshot, including a candidate URL (block 704). The set of features can include words in a candidate URL and numeric features of a URL structure of the candidate URL. The processing logic classifies, using the ML detection system, the candidate URL as malicious or benign using the set of features (block 706). The processing logic outputs an indication of a malicious URL responsive to the candidate URL being classified as malicious (block 708).

In at least one embodiment, the URL structure includes one or more of a sub-domain, a domain, a TLD, a port, a path, a query, and a fragment.

In a further embodiment, the ML detection system includes a binary classification model trained to classify the candidate URL as malicious or benign using tokens representing words in a candidate URL and numeric features of a URL structure of the candidate URL. In at least one embodiment, the binary classification model includes an LSTM layer trained to tokenize the words in the candidate URL into tokens and a fully connected neural network layer trained to classify the candidate URL as malicious or benign using the tokens and the numeric features of the URL structure.

In another embodiment, the ML detection system includes a binary classification model trained to classify candidate URL as malicious or benign by combining natural language processing (NLP) of words in the candidate URL and features of a URL structure of the candidate URL.

DGA Domain Detection

As described above, one type of malicious activity is caused by DGA malware. As described above, data extraction logic 146 can take a snapshot of host physical memory 148 and record data from multiple plugins serially for each snapshot. In each streaming snapshot, ML detection system 134 (or 154) receives data from multiple memory plugins. In at least one embodiment, feature extraction logic 144 can extract one or more candidate URLs from one or more snapshots. In at least one embodiment, once feature extraction logic 144 has extracted one or more candidate URLs, the one or more candidate URLs are fed into DGA detection system 140. In at least one embodiment, DGA detection system 140 includes a two-stage classification model trained to classify the one or more candidate URLs as DGA domain or non-DGA domain in a first stage and classify a DGA family of the DGA domain between a set of DGA families in a second stage using the set of features, as illustrated in FIG. 5A. In another embodiment, the two-stage classification model includes a binary classification model trained to classify the one or more candidate URLs as generated by a DGA malware in a first stage and a multi-class classification model trained to classify a DGA family of the DGA malware between a set of DGA malware families.

Figure 8A:
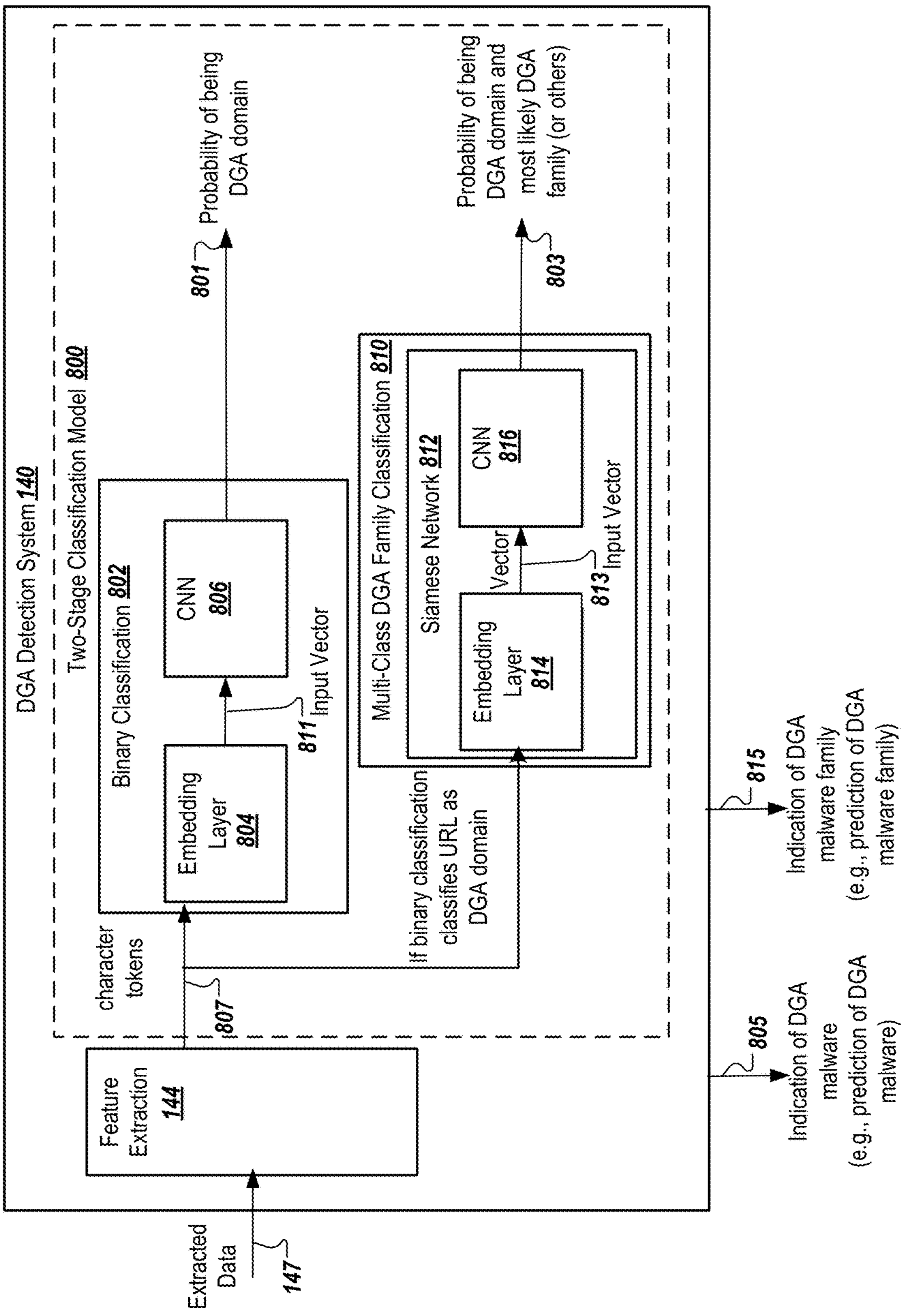
FIG. 8A is a block diagram of an example domain generation algorithm (DGA) detection system, according to at least one embodiment.

FIG. 8A is a block diagram of an example DGA detection system 140, according to at least one embodiment. DGA detection system 140 includes feature extraction logic 144 and two-stage classification model 800 trained to classify a candidate URL as malicious or benign using a set of features. Feature extraction logic 144 receives extracted data 147 and extracts one or more candidate URLs from extracted data 147. For two-stage classification model 800, feature extraction logic 144 extracts domain character features of the one or more candidate URLs. In at least one embodiment, feature extraction logic 144 can tokenize domain characters into character tokens 807. Feature extraction logic 144 can provide character tokens 807 to two-stage classification model 800, which is trained to classify the one or more candidate URLs as having a DGA domain 801 or a non-DGA domain using character tokens 807.

In at least one embodiment, feature extraction logic 144 can extract candidate URLs with text regex (regular expression) functionality. For example, feature extraction logic 144 can extract candidate URLs from data heaps using dynamic allocations, e.g., malloc ( ), stacks using static allocations (e.g., Char arr[ ]="STRING"). In another embodiment, feature extraction logic 144 can extract Vadtree information from the VadInfo plugin.

In at least one embodiment, two-stage classification model 800 a binary classification model 802. Binary classification model 802 can include an embedding layer 804 and a CNN 806. Embedding layer 804 can receive character tokens 807 as an input sequence of tokens representing the domain characters in the one or more candidate URLs. Embedding layer 804 can generate an input vector 811 based on the input sequence of tokens. An input vector 811 can include one embedding for each domain character of a group of domain characters and represent character tokens 807 in a different representation from the input sequence of tokens. Input vector 811 can represent the domain characters in the one or more candidate URLs in a vector space used by CNN 806. CNN 806 can receive input vector 811 and classify the one or more candidate URLs as having a DGA domain 801 using input vector 811. In general, CNN 806 identifies whether the domain characters constitute a sequence of random characters or a sequence of words in a language (e.g., English language). In at least one embodiment, CNN 806 can determine a level of confidence that the one or more candidate URLs corresponds to the DGA domain class. The level of confidence can be a prediction percentage of a DGA domain. For example, if the level of confidence satisfies a level of confidence criterion (e.g., a confidence threshold), CNN 806 can classify the one or more candidate URLs as having DGA domain 801.

In at least one embodiment, DGA detection system 140 can output an indication of DGA malware 805 responsive to the one or more candidate URLs being classified as having DGA domain 801. The indication of DGA malware 805 can specify the level of confidence that the one or more candidate URLs correspond to the DGA domain class. Alternatively, DGA detection system 140 can output an indication of non-DGA domain responsive to the one or more candidate URLs being classified as having a non-DGA domain. The indication of non-DGA domain can indicate a level of confidence that the one or more candidate URLs have non-DGA domains.

In at least one embodiment, two-stage classification model 800 includes binary classification model 802 in a first stage and a multi-class classification model 810 in a second stage. Binary classification model 802 can classify the one or more candidate URLs as having a DGA domain 801. If binary classification model 802 classifies the one or more candidate URLs as having DGA domain 801 in the first stage, multi-class classification model 810 can classify a DGA family 803 of the DGA domain 801 between a set of DGA families. In another embodiment, binary classification model 802 can be trained to classify the one or more candidate URLs as generated by a DGA malware in a first stage, and multi-class classification model 810 can be trained to classify a DGA family of the DGA malware between a set of DGA malware families.

In at least one embodiment, multi-class classification model 810 can include a Siamese network 812 having an embedding layer 814 and a CNN 816. Embedding layer 814 can receive character tokens 807 as an input sequence of tokens representing the domain characters in the one or more candidate URLs. Embedding layer 804 can generate an input vector 813 based on the input sequence of tokens. An input vector 813 can include one embedding for each domain character of a group of domain characters and represent character tokens 807 in a representation different from the input sequence of tokens. Input vector 813 can represent the domain characters in the one or more candidate URLs in a vector space used by CNN 816. CNN 816 can receive input vector 813 and classify a DGA family 803 of the one or more candidate URLs between a set of DGA families using input vector 811. In at least one embodiment, CNN 816 can determine a level of confidence that the one or more candidate URLs belong to DGA family 803. The level of confidence can be a prediction percentage of a DGA family. For example, if the level of confidence satisfies a level of confidence criterion (e.g., a confidence threshold), CNN 816 can classify the one or more candidate URLs as belonging to DGA family 803.

In at least one embodiment, DGA detection system 140 can output an indication of DGA malware family 815 responsive to the one or more candidate URLs being classified as belonging to DGA family 803. The indication of DGA malware family 815 can specify the level of confidence that the one or more candidate URLs belong to DGA family 803. Alternatively, DGA detection system 140 can output an indication of other DGA families responsive to the one or more candidate URLs classified as not belonging to one of the set of DGA families. The indication of other DGA families can indicate a level of confidence. In another embodiment, DGA detection system 140 can output an indication of DGA, a probability of being DGA, a most likely DGA family or "other" DGA families.

In at least one embodiment, binary classification model 802 and multi-class classification model 810 can operate concurrently. In another embodiment, logic can be used to trigger multi-class classification model 810 in response to the one or more candidate URLs being classified as having DGA domain 801.

In at least one embodiment, CNN 816 is trained on a set of DGA families, such as between: Banjori, Corebot, Cryptolocker, Dicrypt, Emotet, Fluebot, Gameover, Murofet, Necurs, Newgoz, Padcrypt, Pykspa, Qadars, Ramdo, Ramnit, Ranbyus, Rovnix, Simda, and Tinba, and all other DGA families can be classified as other DGA families.

In at least one embodiment, CNN 806, 816 with embedding layer 804, 814 can use tokens of domain characters as features. To reduce false positives, classes of non-DGA domain and DGA domain can be weighted (e.g., non-DGA domain: 100 and DGA domain: 1). In at least one embodiment, Siamese network 812 with CNN 816 and embedding layer 814 can use the same tokens of the domain characters as features.

In another embodiment, two-stage classification model 800 can use other NLP models to process domain characters of the one or more candidate URLs to classify them as having DGA domains 801. In another embodiment, NLP models or binary classification model 802 can be used without Siamese network 812 and only classify the candidate URLs as having a DGA domain 801 or a non-DGA domain without classifying a DGA family. In another embodiment, feature extraction logic 144 can extract domain characters, numeric features of a URL, words of the candidate URL, or the like for a more complex classification model.

Figure 8B:
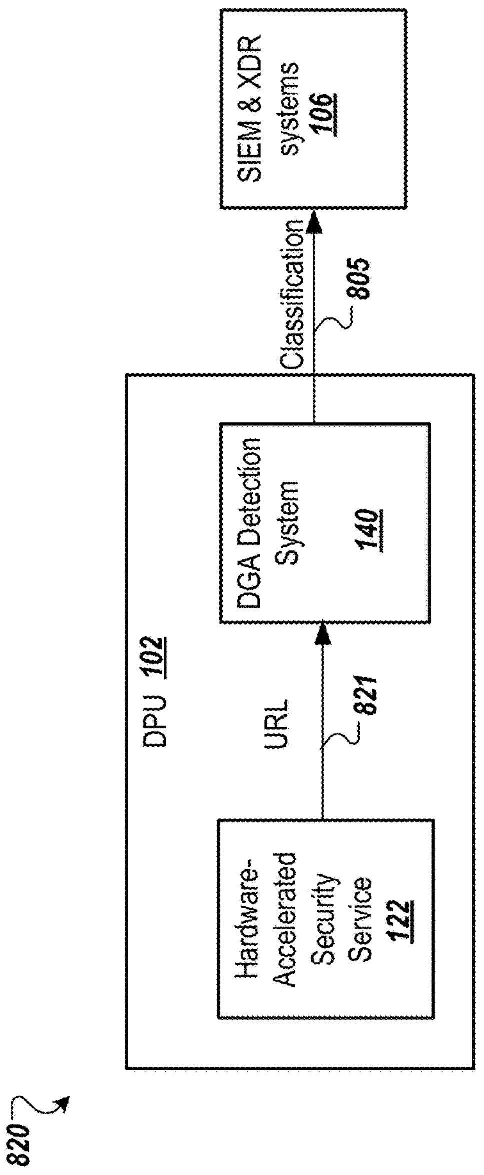
FIG. 8B is a block diagram of an example system architecture for the DGA detection system, according to at least one embodiment.

FIG. 8B is a block diagram of an example system architecture 820 for the DGA detection system 140, according to at least one embodiment. In system architecture 820, DPU 102 hosts hardware-accelerated security service 122 and DGA detection system 140. Hardware-accelerated security service 122 extracts snapshots of memory plugins 321, as described above with respect to FIG. 3A. Hardware-accelerated security service 122 can extract one or more candidate URLs 821 from any one or more of the snapshots of memory plugins and send, or otherwise make available, one or more candidate URLs 821 to DGA detection system 140. In another embodiment, hardware-accelerated security service 122 extracts snapshots of memory plugins 321, as described above with respect to FIG. 3A, and sends snapshots of memory plugins 321 to DGA detection system 140 and DGA detection system 140 extracts one or more candidate URLs 821, such as illustrated in FIG. 8A. DGA detection system 140, using two-stage classification model 800, classifies one or more candidate URLs 821 as having DGA domain or non-DGA domain and classifies a DGA family between multiple DGA families. DGA detection system 140 can output an indication of DGA malware 805 (or indication of non-malware) and/or an indication of DGA family 815 (or indication of other DGA families) to SIEM or XDR system 106 for further actions by SIEM or XDR system 106. SIEM or XDR system 106 can monitor and show results of classifications of DGA domains, such as on a dashboard displayed to a user or operator of SIEM or XDR system 106.

Figure 8C:
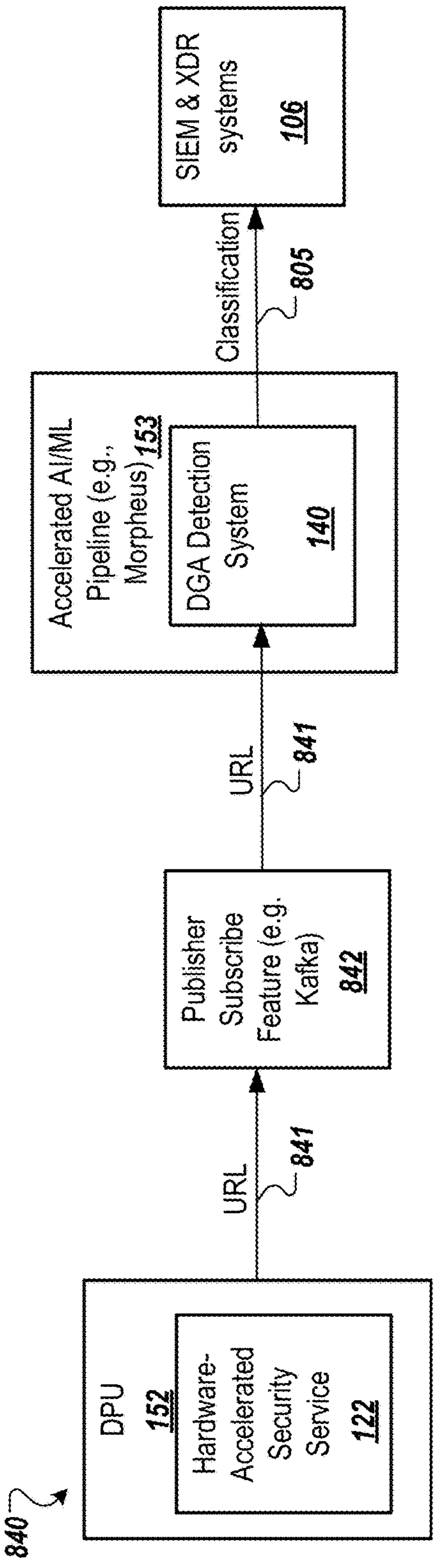
FIG. 8C is a block diagram of an example system architecture for the DGA detection system, according to at least one embodiment.

FIG. 8C is a block diagram of an example system architecture for the DGA detection system 140, according to at least one embodiment. In system architecture 840, DPU 152 hosts hardware-accelerated security service 122 and accelerated AI/ML pipeline 153 hosts the DGA detection system 140. Hardware-accelerated security service 122 extracts one or more candidate URLs 821, as described above with respect to FIG. 3A, and sends, or otherwise makes available, one or more candidate URLs 821 to a publish-subscribe feature 842 (e.g., Kafka). Publish subscribe feature 842 sends, or otherwise makes available, one or more candidate URLs 821 to DGA detection system 140. DGA detection system 140, using two-stage classification model 800, classifies one or more candidate URLs 821 as having DGA domain or non-DGA domain and classifies a DGA family between multiple DGA families. DGA detection system 140 can output an indication of DGA malware 805 (or indication of non-malware) and/or an indication of DGA malware family 815 (or indication of other DGA families) to SIEM or XDR system 106 for further actions by SIEM or XDR system 106.

In at least one embodiment, binary classification model 802 can be subject to a performance evaluation. For the performance evaluation, a training data set includes thousands of DGA domains (e.g., 361,108) and thousands of non-DGA domains (e.g., 715,761), and a test data set includes thousands of DGA domains (e.g., 444,033) and thousands of non-DGA domains (e.g., 178,941). In at least one embodiment, a test set does not describe a correct distribution of classes, so a precision calculation can be changed to meet a distribution of 100 times for non-DGA domains than DGA domains. A precision-recall curve is illustrated in FIG. 9A.

Figure 9A:
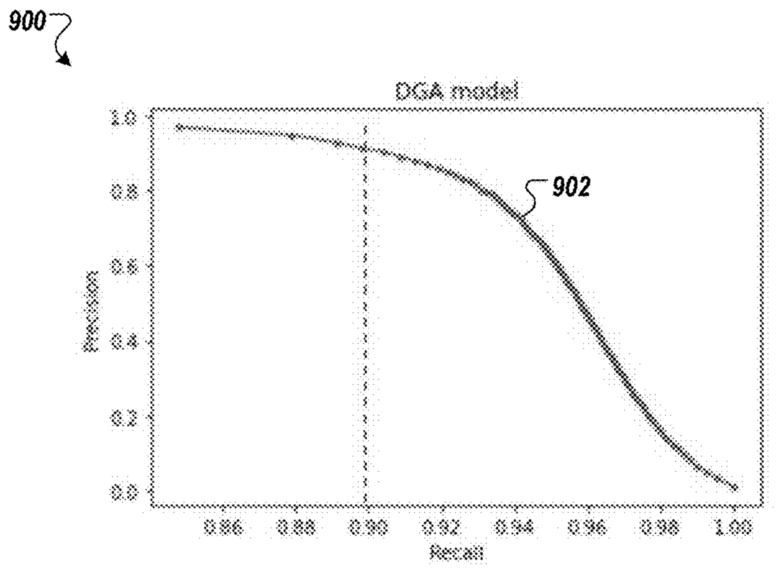
FIG. 9A is a graph illustrating a precision-recall curve of a binary classification model of the DGA detection system, according to at least one embodiment.

FIG. 9A is a graph 900 illustrating a precision-recall curve 902 of binary classification model 802 of the DGA detection system 140, according to at least one embodiment. The recall and precision can be expressed in the following equation, where TP is a true positive, FN is a false negative, and FP is a false positive.

$$\text{Recall} = \frac{TP}{TP + FN}$$

$$DGAAmount = 0.01 \cdot NotDGAAmount$$

$$\text{Precision} = \frac{TP}{TP + FP} \rightarrow \frac{\text{Recall} \cdot DGAAmount}{\text{Recall} \cdot DGAAmount + FP\,(@NotDGAAmount)}$$

As illustrated in precision-recall curve 902 of FIG. 9A, at precision equal to 0.9, a recall value is 0.9.

Figure 9B:
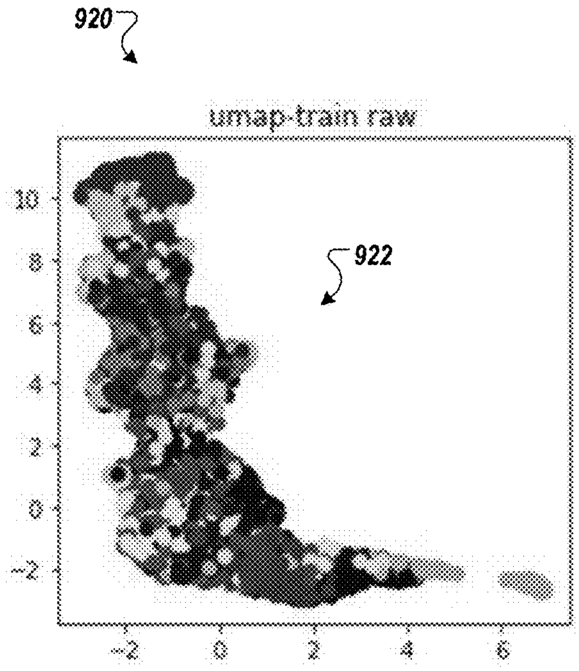
FIG. 9B is a graph illustrating training data before Uniform Manifold Approximation and Projection (UMAP) dimension reduction, according to at least one embodiment.

In at least one embodiment, multi-class classification model 810 can be subject to a performance evaluation. For the performance evaluation, a training data set includes thousands of non-DGA domains (e.g., 715,761) and thousands of DGA domains (e.g., 327,673) from the following families: Banjori, Corebot, Cryptolocker, Dicrypt, Emotet, Fluebot, Gameover, Murofet, Necurs, Newgoz, Padcrypt, Pykspa, Qadars, Ramdo, Ramnit, Ranbyus, Rovnix, Simda, and Tinba. Test data set includes thousands of non-DGA domains (e.g., 178,941) and millions of DGA domains (e.g., 1,310,693) from the following families: Banjori, Corebot, Cryptolocker, Dicrypt, Emotet, Fluebot, Gameover, Murofet, Necurs, Newgoz, Padcrypt, Pykspa, Qadars, Ramdo, Ramnit, Ranbyus, Rovnix, Simda, and Tinba. In at least one embodiment, multi-class classification model 810 can be trained using UMAP. Raw data of UMAP training data is illustrated in FIG. 9B. To show the clustering ability of multi-class classification model 810, UMAP can be used for dimension reduction, as shown in two axes of FIG. 9C.

FIG. 9B is a graph 920 illustrating training data 922 before UMAP dimension reduction, according to at least one embodiment.

Figure 9C:
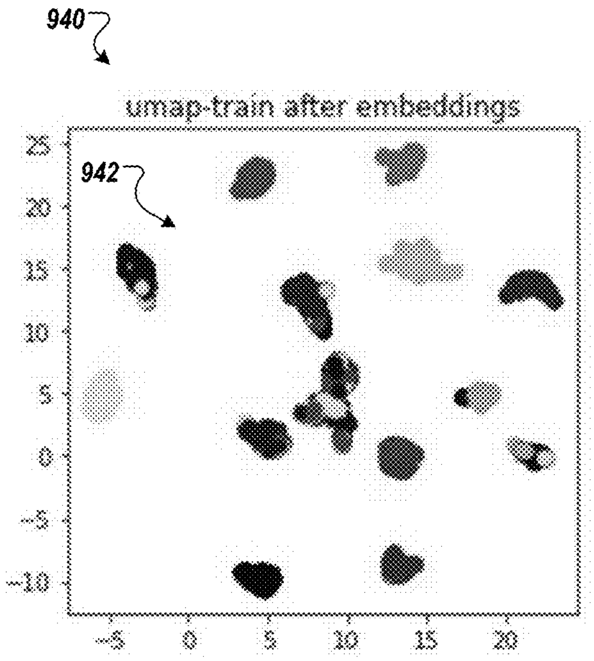
FIG. 9C is a graph illustrating training data after UMAP dimension reduction, according to at least one embodiment.

FIG. 9C is a graph 940 illustrating training data 942 after UMAP dimension reduction, according to at least one embodiment. As shown in graph 940, multi-class classification model 810 can successfully cluster the training data set into multiple classes, representing each of the DGA families, without many false positives. Multi-class classification model 810 can classify a DGA family of the domain characters of the one or more candidate URLs between the multiple DGA families. If a candidate URL is not found to be within one of the specified clusters, it can be classified as part of an "other" DGA family's classification.

Figure 10:
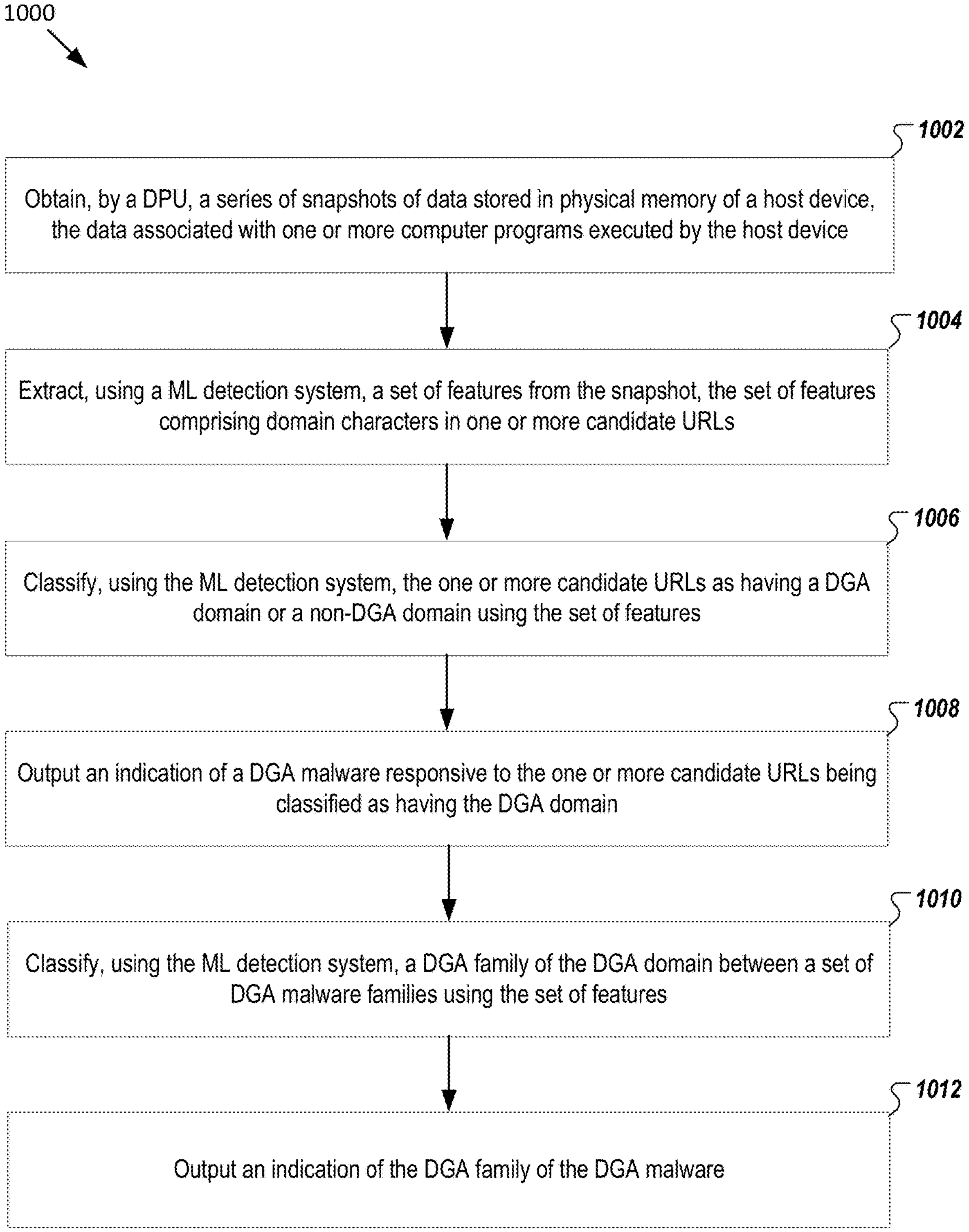
FIG. 10 is a flow diagram of an example method of DGA detection using a two-stage classification model, according to at least one embodiment.

FIG. 10 is a flow diagram of an example method 1000 of DGA detection using a two-stage classification model, according to at least one embodiment. In at least one embodiment, method 1000 may be performed by processing logic of DPU 102. In at least one embodiment, method 1000 may be performed by processing logic of DPU 152 and processing logic of accelerated AI/ML pipeline 153. In at least one embodiment, method 1000 may be performed by processing logic of DGA detection system 140 of FIGS. 1A-1B, 8A-8B. The processing logic can be a combination of hardware, firmware, software, or any combination thereof. Method 1000 may be performed by one or more data processing units (e.g., DPUs, CPUs, and/or GPUs), which may include (or communicate with) one or more memory devices. In at least one embodiment, method 1000 may be performed by multiple processing threads, each thread executing one or more individual functions, routines, subroutines, or operations of the method. In at least one embodiment, processing threads implementing method 1000 may be synchronized (e.g., using semaphores, critical sections, and/or other thread synchronization logic). Alternatively, processing threads implementing method 1000 may be executed asynchronously with respect to each other. Various operations of method 1000 may be performed in a different order compared with the order shown in FIG. 10. Some operations of the methods may be performed concurrently with other operations. In at least one embodiment, one or more operations shown in FIG. 10 may not always be performed.

Referring to FIG. 10, the processing logic obtains a snapshot of data stored in the physical memory, the data being associated with one or more computer programs executed by a host device (block 1002). The processing logic extracts, using an ML detection system, a set of features from the snapshot, the set of features including domain characters in one or more candidate URLs (block 1004). The processing logic classifies, using the ML detection system, the one or more candidate URLs as having a DGA domain or a non-DGA domain using the set of features (block 1006). The processing logic outputs an indication of a DGA malware responsive to the one or more candidate URLs being classified as having the DGA domain (block 1008). In a further embodiment, the processing logic classifies, using the ML detection system, a DGA family of the DGA malware between a set of DGA malware families using the set of features (block 1010). The processing logic outputs an indication of the DGA family of the DGA malware (block 1012).

In at least one embodiment, the ML detection system includes a two-stage classification model, including a binary classification model and a multi-class classification model. In at least one embodiment, the binary classification model is trained to classify the one or more candidate URLs as having the DGA domain or the non-DGA domain in a first stage, and the multi-classclassification model is trained to classify the DGA family of the DGA domain between the set of DGA families in a second stage. In at least one embodiment, the binary classification model is trained to tokenize domain characters in the one or more candidate URLs and classify the one or more candidate URLs as having the DGA domain or the non-DGA domain using the tokens in a first stage. In at least one embodiment, the multi-class classification model is trained to classify the DGA family of the DGA domain between the set of DGA families using the tokens in a second stage.

In at least one embodiment, the binary classification model includes a CNN with an embedding layer to tokenize the domain characters of the one or more candidate URLs into the tokens, the CNN using the tokens of the domain characters as the set of features, and the multi-class classification model includes a Siamese network of the CNN with the embedding layer, the Siamese network using the tokens of the domain characters as the set of features.

Other variations are within the spirit of the present disclosure. Thus, while disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

Use of the terms "a" and "an" and "the" and similar referents in the context of describing disclosed embodiments (especially in the context of the following claims) are to be construed to cover both singular and plural, unless otherwise indicated herein or clearly contradicted by context, and not as a definition of a term. The terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within range unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, the code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, the code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause the computer system to perform operations described herein. A set of non-transitory computer-readable storage media, in at least one embodiment, comprises multiple non-transitory computer-readable storage media, and one or more individual non-transitory storage media of the multiple non-transitory computer-readable storage media lack all of the code while the multiple non-transitory computer-readable storage media collectively store all of the code. In at least one embodiment, the executable instructions are executed such that different instructions are executed by different processors—for example, a non-transitory computer-readable storage medium stores instructions, and a main CPU executes some of the instructions while a GPU executes other instructions. In at least one embodiment, different components of a computer system have separate processors, and different processors execute different subsets of the instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure, and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In the description and claims, the terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout the specification terms such as "processing," "computing," "calculating," "determining," or the like, refer to action and/or processes of a computer or computing system, or similar electronic computing devices, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes for carrying out instructions in sequence or in parallel, continuously, or intermittently. The terms "system" and "method" are used herein interchangeably insofar as a system may embody one or more methods, and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or interprocess communication mechanism.

Although the discussion above sets forth example implementations of described techniques, other architectures may be used to implement described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:

obtaining, using a data processing unit (DPU) operatively coupled to a host device, a series of snapshots of data stored in physical memory of the host device, the data being associated with one or more computer programs executed by the host device, wherein the series of snapshots of data are obtained by the DPU using out-of-band memory acquisitions isolated from the one or more computer programs;

extracting, using a machine learning (ML) detection system, a set of features from each snapshot of the series of snapshots, each snapshot representing the data at a point in time;

classifying, using the set of features and the ML detection system, a process of the one or more computer programs as ransomware or non-ransomware; and outputting an indication of ransomware responsive to the process being classified as ransomware.

2. The method of claim 1, wherein the ML detection system comprises a random-forest classification model, wherein the random-forest classification model is a time-series-based model trained to classify a process as ransomware or non-ransomware using cascading of different numbers of snapshots in the series of snapshots.

3. The method of claim 2, wherein the cascading of different numbers of snapshots in the series of snapshots comprises:

a first number of snapshots obtained over a first amount of time;

a second number of snapshots obtained over a second amount of time greater than the first amount of time, the second number of snapshots comprising the first number of snapshots; and a third number of snapshots obtained over a third amount of time greater than the second amount of time, the third number of snapshots comprising the second number of snapshots.

4. The method of claim 1, wherein the ML detection system comprises a time-based classification model trained to classify a process as ransomware or non-ransomware using different feature sets over different amounts of time.

5. The method of claim 4, wherein the different feature sets comprise:

a first set of features extracted from a first set of snapshots, representing the data stored in the physical memory over a first period; and a second set of features extracted from a second set of snapshots, representing the data stored in the physical memory over a second period greater than the first period.

6. The method of claim 5, wherein the different feature sets further comprise a third set of features extracted from a third set of snapshots, representing the data stored in the physical memory over a third period greater than the second period.

7. The method of claim 1, wherein extracting the set of features comprises extracting the set of features from different memory plugins from each snapshot of the series of snapshots, wherein the data comprises information about each process of a list of processes of the one or more computer programs, wherein the set of features further comprises at least one of:

information about one or more threads used by one or more processes in the list of processes;

information about one or more modules used by one or more processes in the list of processes;

information about handles used by one or more processes in the list of processes;

information about virtual address descriptors (VADs); or information about environment variables.

8. An integrated circuit comprising:

a host interface operatively coupled to physical memory associated with a host device;

a central processing unit (CPU) operatively coupled to the host interface; and an acceleration hardware engine operatively coupled to the host interface and the CPU, wherein the CPU and the acceleration hardware engine are to host a hardware-accelerated security service to protect the host device, wherein the hardware-accelerated security service is to:

obtain a series of snapshots of data stored in the physical memory of the host device, the data being associated with one or more computer programs executed by the host device, wherein the series of snapshots of data are obtained by the hardware-accelerated security service using out-of-band memory acquisitions isolated from the one or more computer programs;

extract, using a machine learning (ML) detection system, a set of features from each snapshot of the series of snapshots, each snapshot representing the data at a point in time;

classify, using the set of features and the ML detection system, a process of the one or more computer programs as ransomware or non-ransomware; and output an indication of ransomware responsive to the process being classified as ransomware.

9. The integrated circuit of claim 8, wherein the integrated circuit is a data processing unit (DPU), wherein the DPU is a programmable data center infrastructure on a chip, wherein the one or more computer programs comprises at least one of a host operating system (OS), an application, a guest operating system, or a guest application.

10. The integrated circuit of claim 8, wherein:

the hardware-accelerated security service is to obtain a series of snapshots of the data stored in the physical memory, each snapshot representing the data at a point in time;

the ML detection system comprises:

feature extraction logic to extract a set of features from different memory plugins from each snapshot of the series of snapshots; and a random-forest classification model, wherein the random-forest classification model is a time-series-based model trained to classify a process as ransomware or non-ransomware using cascading of different numbers of snapshots in the series of snapshots.

11. The integrated circuit of claim 10, wherein the cascading of different numbers of snapshots in the series of snapshots comprises:

a first number of snapshots obtained over a first amount of time;

a second number of snapshots obtained over a second amount of time greater than the first amount of time, the second number of snapshots comprising the first number of snapshots; and a third number of snapshots obtained over a third amount of time greater than the second amount of time, the third number of snapshots comprising the second number of snapshots.

12. The integrated circuit of claim 8, wherein the one or more computer programs reside in a first computing domain, wherein the hardware-accelerated security service and the ML detection system reside in a second computing domain different than the first computing domain.

13. The integrated circuit of claim 8, wherein the hardware-accelerated security service is out-of-band security software in a trusted domain that is different and isolated from the ransomware.

14. The integrated circuit of claim 8, further comprising a direct memory access (DMA) controller coupled to the host interface, wherein the DMA controller is to read the data from the physical memory via the host interface, wherein the host interface is a Peripheral Component Interconnect Express (PCIe) interface.

15. A computing system comprising:

a data processing unit (DPU) comprising a host interface, a central processing unit (CPU), and an acceleration hardware engine, the DPU to host a hardware-accelerated security service to protect a host device, wherein the hardware-accelerated security service is to extract a plurality of features from data stored in physical memory associated with the host device, the data being associated with one or more computer programs executed by the host device; and accelerated pipeline hardware coupled to the DPU, wherein the accelerated pipeline hardware is to:

obtain a series of snapshots of data stored in the physical memory of the host device, the data being associated with the one or more computer programs, wherein the series of snapshots of data are obtained by the accelerated pipeline hardware using out-of-band memory acquisitions isolated from the one or more computer programs;

extract, using a machine learning (ML) detection system, a set of features from each snapshot of the series of snapshots, each snapshot representing the data at a point in time;

classify, using the set of features and the ML detection system, a process of the one or more computer programs as ransomware or non-ransomware; and output an indication of ransomware responsive to the process being classified as ransomware.

16. The computing system of claim 15, wherein:

the hardware-accelerated security service is to obtain a series of snapshots of the data stored in the physical memory, each snapshot representing the data at a point in time;

the ML detection system comprises:

feature extraction logic to extract a set of features from different memory plugins from each snapshot of the series of snapshots; and a random-forest classification model, wherein the random-forest classification model is a time-series-based model trained to classify a process as ransomware or non-ransomware using cascading of different numbers of snapshots in the series of snapshots.

17. The computing system of claim 16, wherein the cascading of different numbers of snapshots in the series of snapshots comprises:

a first number of snapshots obtained over a first amount of time;

a second number of snapshots obtained over a second amount of time greater than the first amount of time, the second number of snapshots comprising the first number of snapshots; and a third number of snapshots obtained over a third amount of time greater than the second amount of time, the third number of snapshots comprising the second number of snapshots.

18. The computing system of claim 15, wherein the one or more computer programs comprises at least one of a host operating system (OS), an application, a guest operating system, or a guest application, wherein the one or more computer programs reside in a first computing domain, wherein the hardware-accelerated security service resides in a second computing domain different than the first computing domain, and wherein the ML detection system resides in the second computing domain or a third computing domain different than the first computing domain and the second computing domain.

19. The computing system of claim 15, wherein the hardware-accelerated security service is out-of-band security software in a trusted domain that is different and isolated from the ransomware.

20. The computing system of claim 15, further comprising a direct memory access (DMA) controller coupled to the host interface, wherein the DMA controller is to read the data from the physical memory via the host interface, wherein the host interface is a Peripheral Component Interconnect Express (PCIe) interface.

* * * * *